(12) United States Patent
Sekizawa

(10) Patent No.: US 9,195,359 B2
(45) Date of Patent: Nov. 24, 2015

(54) PROVIDING RESISTANCE PORTIONS ALONG TOUCH PANEL ELECTRODES, FOR ADJUSTING ELECTRIC POTENTIAL DISTRIBUTION

(75) Inventor: Mitsuhiro Sekizawa, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 71 days.

(21) Appl. No.: 13/527,711

(22) Filed: Jun. 20, 2012

(65) Prior Publication Data

US 2012/0327017 A1 Dec. 27, 2012

(30) Foreign Application Priority Data

Jun. 24, 2011 (JP) ................................. 2011-141143

(51) Int. Cl.
*G06F 3/045* (2006.01)
(52) U.S. Cl.
CPC ...... *G06F 3/045* (2013.01); *G06F 2203/04113* (2013.01)
(58) Field of Classification Search
CPC ....... G06F 3/045; G06F 3/041; G06F 3/0487; G06F 3/0488; G06F 2203/04113
USPC ............ 345/173–178, 18.01–18.11; 338/210; 341/33; 427/96.1; 178/18.05
See application file for complete search history.

(56) References Cited

U.S. PATENT DOCUMENTS

| | | | | |
|---|---|---|---|---|
| 4,198,539 A | * | 4/1980 | Pepper, Jr. ................. | 178/18.05 |
| 4,731,508 A | * | 3/1988 | Gibson et al. .............. | 178/18.05 |
| 4,797,514 A | | 1/1989 | Talmage, Jr. et al. | |
| 4,822,957 A | * | 4/1989 | Talmage et al. ............ | 178/18.05 |
| 5,045,644 A | * | 9/1991 | Dunthorn .................... | 178/18.05 |
| 5,736,688 A | * | 4/1998 | Barrett et al. ............... | 178/18.05 |
| 6,278,444 B1 | * | 8/2001 | Wilson et al. ................ | 345/173 |
| 6,549,193 B1 | * | 4/2003 | Huang et al. ................. | 345/173 |
| 6,559,835 B1 | * | 5/2003 | Randall ........................ | 345/173 |
| 6,593,916 B1 | * | 7/2003 | Aroyan ........................ | 345/173 |
| 6,781,579 B2 | * | 8/2004 | Huang et al. ................. | 345/173 |
| 6,819,316 B2 | * | 11/2004 | Schulz et al. ................. | 345/174 |
| 7,148,881 B2 | * | 12/2006 | Lee et al. ..................... | 345/173 |
| 7,215,331 B2 | * | 5/2007 | Song et al. ................... | 345/173 |

(Continued)

FOREIGN PATENT DOCUMENTS

EP 2267584 A1 * 12/2010
JP S63-024410 2/1988

(Continued)

*Primary Examiner* — Dwayne Bost
*Assistant Examiner* — Darlene M Ritchie
(74) *Attorney, Agent, or Firm* — IPUSA, PLLC

(57) ABSTRACT

A touch panel includes first and second electrode substrates including first and second conductive layers; a first electrode and a second electrode provided on the first conductive layer for causing an electric potential distribution; a third electrode and a fourth electrode provided on the first conductive layer for causing an electric potential distribution such that the first electrode and the second electrode are electrically connected by the third electrode and the fourth electrode; and a resistance adjusting member including a first resistance portion and a second resistance portion electrically connected to the first electrode and the second electrode in parallel, respectively, and configured such that resistance values of the first resistance portion and the second resistance portion become lower at the center than at the outer sides in the longitudinal direction of the first electrode and the second electrode, respectively.

9 Claims, 13 Drawing Sheets

(56) References Cited

U.S. PATENT DOCUMENTS

| | | | |
|---|---|---|---|
| 7,265,686 B2 * | 9/2007 | Hurst et al. | 341/33 |
| 7,307,624 B2 * | 12/2007 | Geaghan et al. | 345/173 |
| 7,327,352 B2 * | 2/2008 | Keefer et al. | 345/173 |
| 7,825,906 B2 | 11/2010 | Nakajima et al. | |
| 7,952,567 B2 * | 5/2011 | Aroyan et al. | 345/174 |
| 8,242,877 B2 * | 8/2012 | Yeh et al. | 338/210 |
| 8,411,048 B2 * | 4/2013 | Yeh et al. | 345/173 |
| 2002/0135569 A1 * | 9/2002 | Chen | 345/173 |
| 2004/0100455 A1 * | 5/2004 | Cheng | 345/174 |
| 2005/0110766 A1 * | 5/2005 | Kent et al. | 345/173 |
| 2005/0110767 A1 * | 5/2005 | Gomes et al. | 345/173 |
| 2005/0260338 A1 * | 11/2005 | Chien | 427/96.1 |
| 2006/0181516 A1 * | 8/2006 | Staines | 345/173 |
| 2009/0184931 A1 * | 7/2009 | Yang | 345/173 |
| 2009/0266624 A1 * | 10/2009 | Kondoh et al. | 178/18.05 |
| 2009/0283498 A1 * | 11/2009 | Kondoh | 216/65 |
| 2010/0001977 A1 * | 1/2010 | Lin et al. | 345/174 |
| 2010/0149122 A1 * | 6/2010 | Lin | 345/173 |
| 2010/0214233 A1 * | 8/2010 | Lee | 345/173 |
| 2011/0285661 A1 * | 11/2011 | Hotelling | 345/174 |

FOREIGN PATENT DOCUMENTS

| | | |
|---|---|---|
| JP | 2007-025904 | 2/2007 |
| JP | 2007-531082 | 11/2007 |
| JP | 2011-003049 | 1/2011 |
| KR | 10-2002-0091297 | 12/2002 |
| WO | WO2005/010804 | 2/2005 |
| WO | WO 2011152560 A1 * | 12/2011 |

* cited by examiner

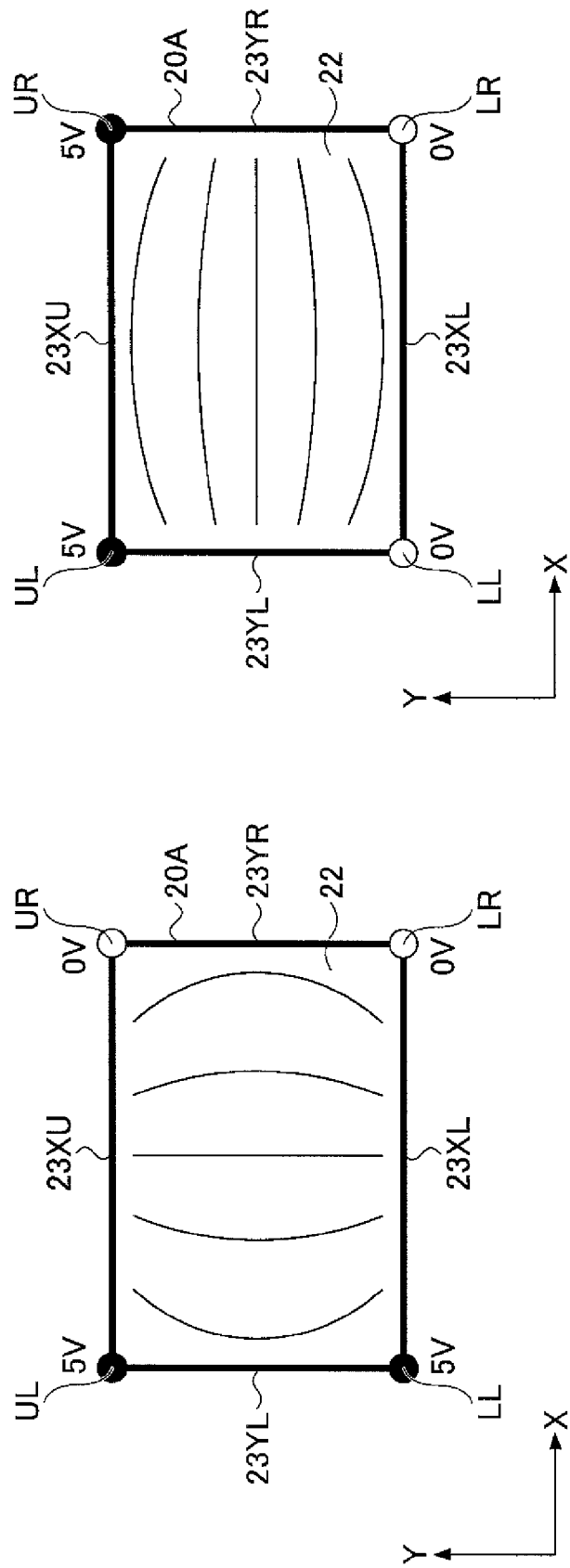

PROVIDING RESISTANCE PORTIONS ALONG TOUCH PANEL ELECTRODES, FOR ADJUSTING ELECTRIC POTENTIAL DISTRIBUTION

BACKGROUND OF THE INVENTION

1. Field of the Invention

The present invention relates to a touch panel.

2. Description of the Related Art

Patent Document 1 discloses a touch panel in which assistance electrodes, each being formed in a line shape, are provided in parallel with four electrodes, to be electrically connected to the four electrodes via an ITO pattern, respectively. In this technique, the assistance electrodes are spaced apart from each other so as to prevent them from being electrically connected with each other. The touch panel further includes connecting lines that connect the four electrodes to a control unit at corners of a rectangular ring shape structure formed by the four electrodes, and connecting lines that connect the assistance electrodes to the control unit from both sides of each of the assistance electrodes.

Patent Document 2 discloses a touch sensor including a substrate including a resistance touching area, a pair of electrodes electrically connected to the touching area, a cover sheet that includes a conductive layer which is formed on and in the vicinity of the electrodes to face the touching area, plural band portions provided at the outside peripheral of the touching area and having a resistance value between that of the electrodes and that of the touching area to provide a transition between the low-resistance electrodes and the high-resistance touching area.

Patent Document 3 discloses a touch panel including a resistance film, a common electrode to provide a voltage to the resistance film and a voltage supplying unit that supplies the voltage to the common electrode, where an electric potential distribution is generated by supplying the voltage from the voltage supplying unit to the common electrode and from the common electrode to the resistance film. In this touch panel, a touched position is detected by detecting the electric potential of the resistance film at the touched position. The touch panel further includes an insulating layer which is provided between the common electrode and the resistance film.

Unfortunately, for the conventional touch panel, distortion of an electric potential distribution is generated when applying voltages to the electrodes to detect the touched position.

If the distortion of an electric potential distribution is generated, the touched position cannot be accurately detected.

Patent Document

[Patent Document 1] Japanese Laid-open Patent Publication No. 2011-003049
[Patent Document 2] Japanese translation of PCT International Application No. 2007-531082
[Patent Document 3] Japanese Laid-open Patent Publication No. 2007-025904

SUMMARY OF THE INVENTION

According to an embodiment, there is provided a touch panel including a first electrode substrate including a first substrate and a first conductive layer formed on the first substrate; a second electrode substrate including a second substrate and a second conductive layer formed on the second substrate to face the first conductive layer; a first electrode and a second electrode provided to be parallel to each other on the first conductive layer for causing an electric potential distribution; a third electrode and a fourth electrode provided to be parallel to each other on the first conductive layer for causing an electric potential distribution such that the first electrode and the second electrode are electrically connected by the third electrode and the fourth electrode to form a rectangular ring shape; and a resistance adjusting member including a first resistance portion and a second resistance portion electrically connected to the first electrode and the second electrode in parallel, respectively, and configured such that resistance values of the first resistance portion and the second resistance portion become lower at the center than at the outer sides in the longitudinal direction of the first electrode and the second electrode, respectively.

BRIEF DESCRIPTION OF THE DRAWINGS

Other objects, features and advantages of the present invention will become more apparent from the following detailed description when read in conjunction with the accompanying drawings.

FIG. 7A and FIG. 7B are plan views showing an electric potential distribution generated on a lower electrode substrate of a relative example;

DETAILED DESCRIPTION OF THE PREFERRED EMBODIMENTS

Figure 1:
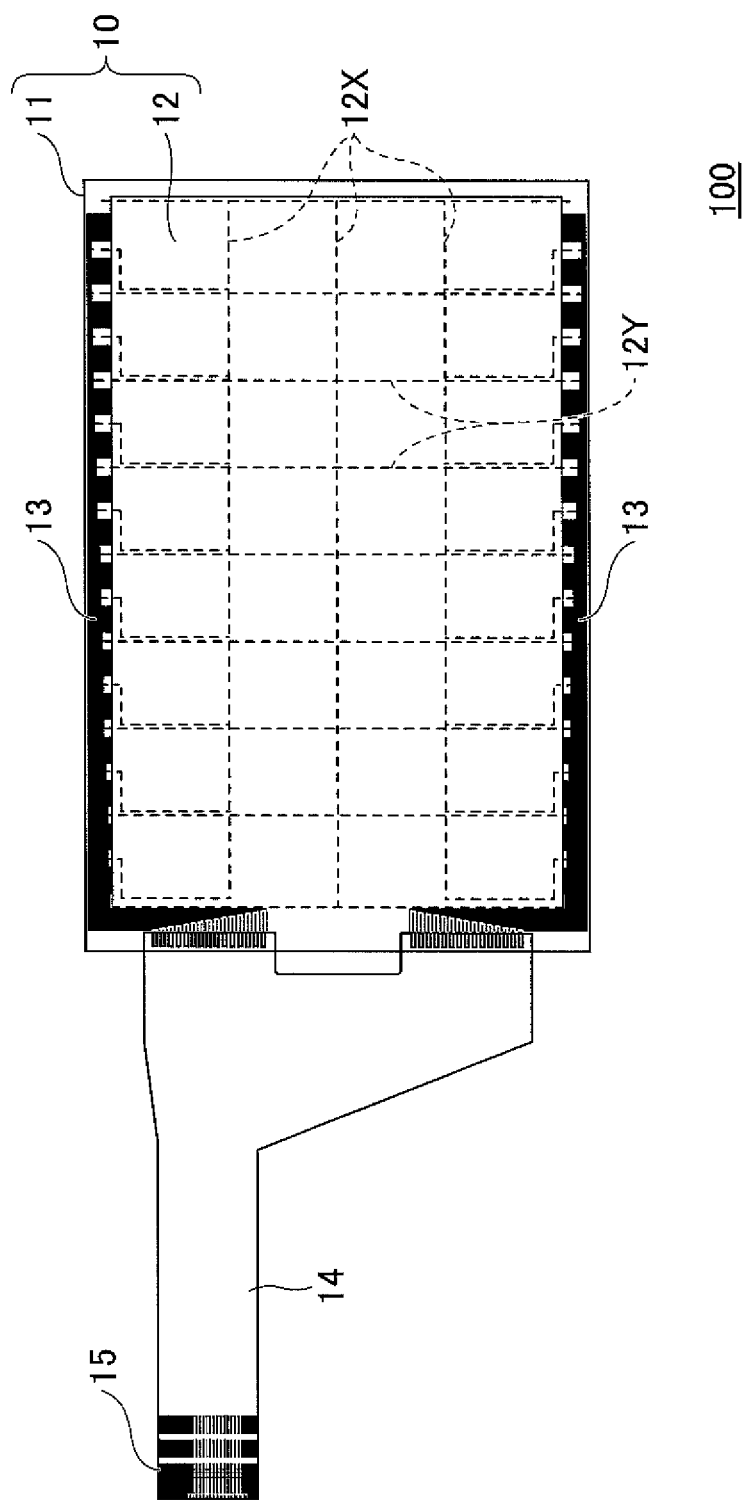
FIG. 1 is a plan view showing an example of a structure of an upper electrode substrate of a touch panel of a first embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(First Embodiment)

Figure 2:
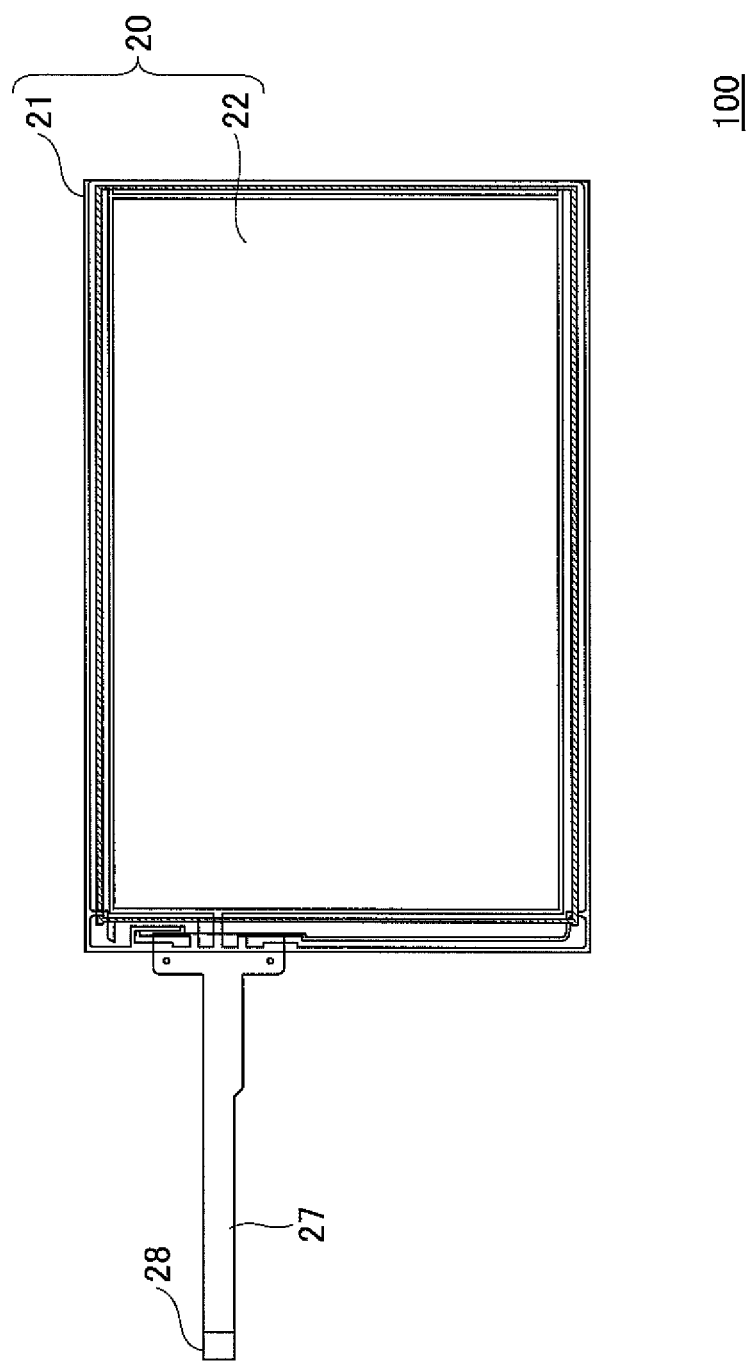
FIG. 2 is a plan view showing an example of a structure of a lower electrode substrate of the touch panel of the first embodiment.
Figure 3:
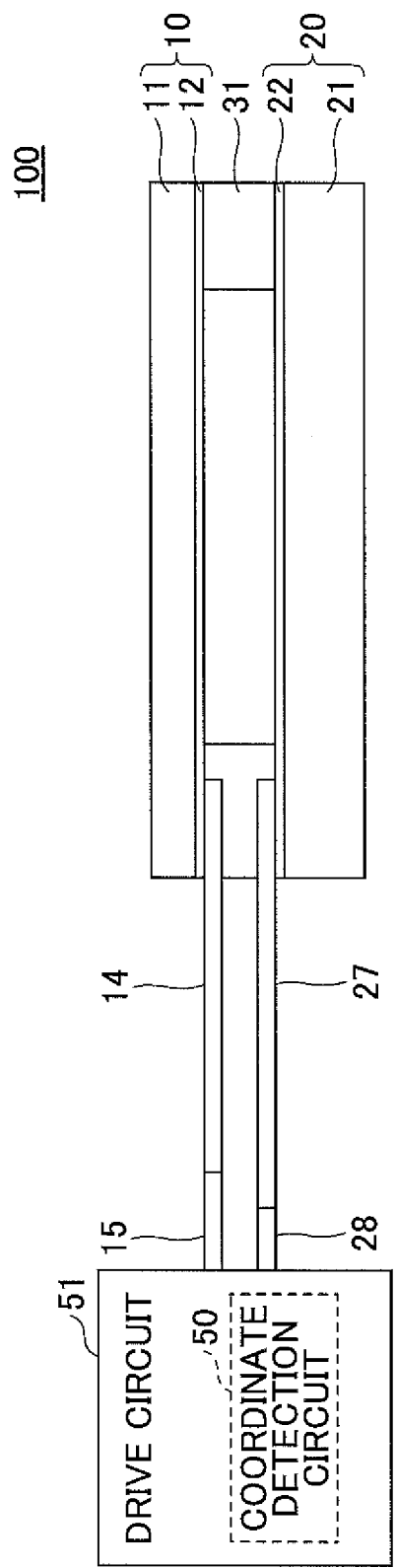
FIG. 3 is a cross-sectional view of the touch panel of the first embodiment.
Figure 4:
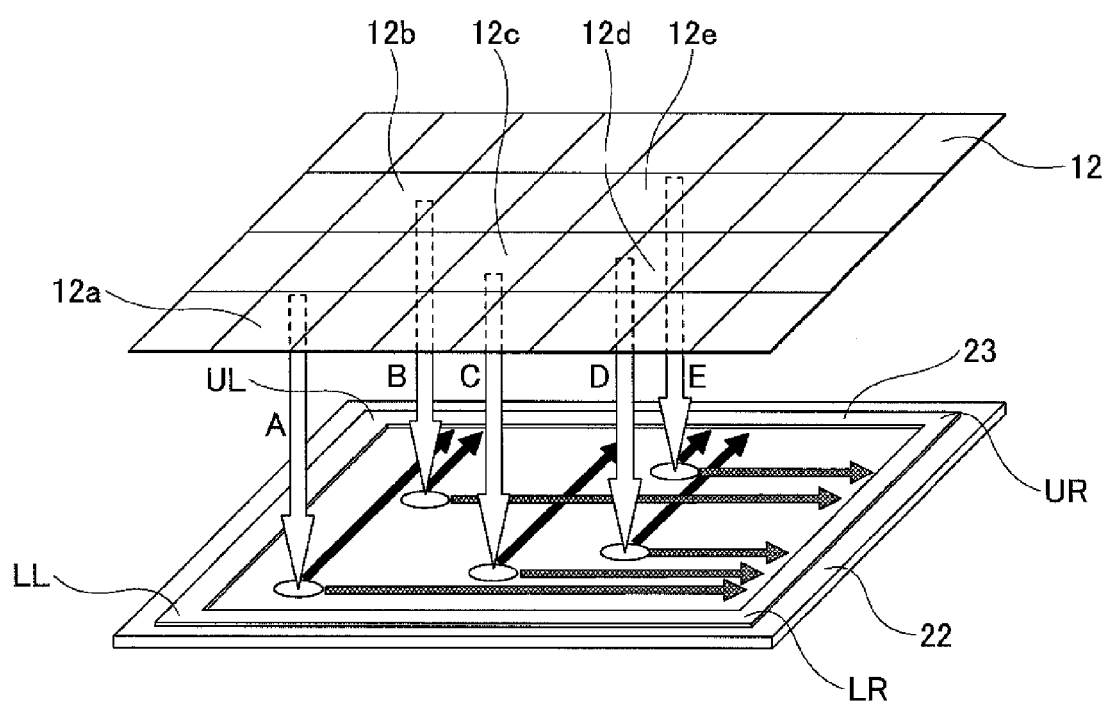
FIG. 4 is a perspective view for explaining an operation of the touch panel of the first embodiment.
Figure 5A:
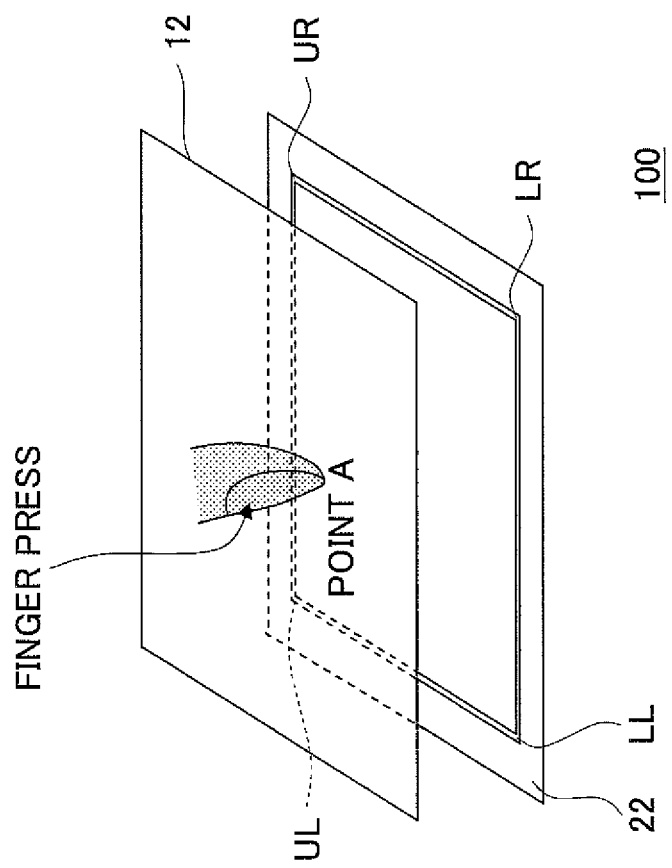
FIG. 5A and FIG. 5B are views for explaining an operation of the touch panel of the first embodiment.
Figure 5B:
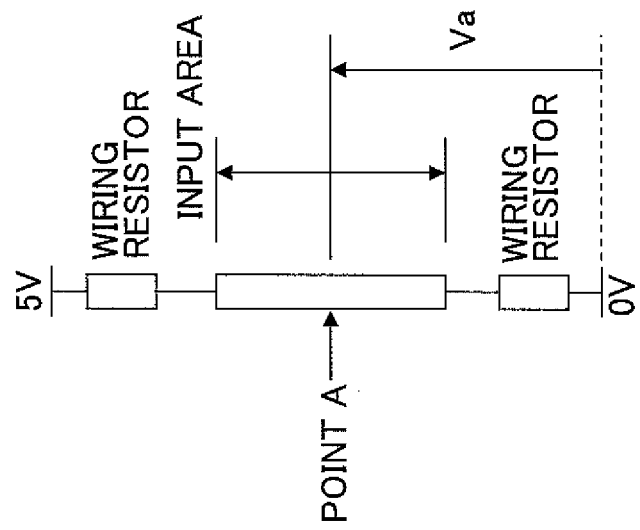

FIG. 1 is a plan view showing an example of a structure of an upper electrode substrate of a touch panel of the first embodiment. FIG. 2 is a plan view showing an example of a structure of a lower electrode substrate of the touch panel of the first embodiment. FIG. 3 is a cross-sectional view of the touch panel of the first embodiment. FIG. 4 is a perspective view for explaining an operation of the touch panel of the first embodiment. FIG. 5A and FIG. 5B are views for explaining an operation of the touch panel of the first embodiment.

The touch panel 100 of the first embodiment includes an upper electrode substrate 10, a lower electrode substrate 20, a leader electrode unit 13, a flexible substrate (Flexible Printed Circuit board: FPC) 14, a terminal 15, a flexible substrate 27, a terminal 28 and a spacer 31.

The upper electrode substrate 10 includes a film substrate 11 and a transparent conductive layer 12 formed the film substrate 11. The transparent conductive layer 12 may be formed on a surface of the film substrate 11 to be in contact with the film substrate 11 in this embodiment.

The lower electrode substrate 20 includes a glass substrate 21 and a transparent conductive layer 22 formed the glass substrate 21. The transparent conductive layer 22 is formed on a surface of the glass substrate 21 to be in contact with the glass substrate 21 in this embodiment. The upper electrode substrate 10 has a substantially rectangular shape in a plan view. The lower electrode substrate 20 has substantially the same shape as the upper electrode substrate 10.

The touch panel 100 further includes a drive circuit 51 including a coordinate detection circuit 50 as shown in FIG. 3. The drive circuit 51 shown in FIG. 3 is just an example, and the structure of the drive circuit 51 is not limited to that shown in FIG. 3.

The upper electrode substrate 10 and the lower electrode substrate 20 are stacked such that the transparent conductive layer 12 of the upper electrode substrate 10 and the transparent conductive layer 22 of the lower electrode substrate 20 face each other via the spacer 31 or the like and bonded by an adhesive, a double-sided tape or the like.

As shown in FIG. 1, the transparent conductive layer 12 of the upper electrode substrate 10 is divided into 32 conductive areas including 8 divided parts in a length direction, which is a long direction of the upper electrode substrate 10, and four divided parts in a width direction, which is a short direction of the upper electrode substrate 10.

Here, among lines dividing the transparent conductive layer 12 into 32 conductive areas, the lines extending in the length direction are referred to as lines 12X and the lines extending in the width direction are referred to as lines 12Y.

The transparent conductive layer 12 is divided into the plural conductive areas by removing the transparent conductive layer 12 at positions which are to be the lines 12X and 12Y. With this, the divided conductive areas of the transparent conductive layer 12 are electrically insulated from each other.

The leader electrode unit 13 is provided at a peripheral portion of the upper electrode substrate 10 and includes plural leader electrodes respectively provided at both ends of the upper electrode substrate 10 in the width direction. The conductive areas of the transparent conductive layer 12 are respectively connected to the leader electrodes of the leader electrode unit 13. The leader electrode unit 13 is connected to the flexible substrate 14 at an end of the upper electrode substrate 10 in the length direction. The terminal 15 is connected to an end of the flexible substrate 14. The terminal 15 is connected to the drive circuit 51 including the coordinate detection circuit 50 (see FIG. 3).

As shown in FIG. 4, the touch panel 100 further includes an electrode 23 formed on the transparent conductive layer 22 of the lower electrode substrate 20 at a peripheral portion of the lower electrode substrate 20. The electrode 23 is provided near four edges of the lower electrode substrate 20 and has a rectangular ring shape in a plan view.

The electrode 23 may be made of a conductive material such as Ag—C, Ag or the like, for example.

Although not shown in the drawings, leader lines for controlling electric potentials of the four corner portions LL, LR, UL and UR are provided to be electrically connected to the electrode 23 at four corner portions LL, LR, UL and UR. In this embodiment, an example where the electrode 23 is made of Ag—C is explained.

The leader lines connected to the electrode 23 are led from the peripheral portion of the lower electrode substrate 20 to be connected to the flexible substrate 27 at an end of the lower electrode substrate 20 in the length direction as shown in FIG. 2. The terminal 28 is connected to the flexible substrate 27.

The lower electrode substrate 20 of the touch panel 100 of the first embodiment further includes a resistance adjusting member, which will be explained later with reference to FIG. 6.

The terminal 15 of the flexible substrate 14 and the terminal 28 of the flexible substrate 27 are connected to the drive circuit 51.

The transparent conductive layer 12 and the transparent conductive layer 22 may be made of a material which is transparent and has electric conductivity such as Indium Tin Oxide (ITO), a material obtained by adding Al, Ga or the like to ZnO (zinc oxide), a material obtained by adding Sb or the like to $SnO_2$ (tin oxide) or the like.

The film substrate 11 may be made of a resin material which is transparent at a visible area such as polyethylene terephthalate (PET), polycarbonate (PC) or the like. Further, instead of the glass substrate 21, a resin substrate may be used.

Here, the glass substrate 21 is an example of a first substrate, the transparent conductive layer 22 is an example of a first conductive layer, and the lower electrode substrate 20 is an example of a first electrode substrate. The film substrate 11 is an example of a second substrate, the transparent conductive layer 12 is an example of a second conductive layer, and the upper electrode substrate 10 is an example of a second electrode substrate.

The operation of the touch panel 100 of the first embodiment for detecting a touched position is explained with reference to FIG. 5A and FIG. 5B.

When detecting the touched position, a voltage, controlled by the drive circuit 51, is alternately applied to the corner portions LL, LR, UL and UR of the electrode 23 formed on the transparent conductive layer 22 of the lower electrode substrate 20 such that the voltages are alternately applied in an X-axis direction (which is a length direction in FIG. 5A) and in a Y-axis direction (which is a width direction in FIG. 5A).

With reference to FIG. 5A, in the touch panel 100 of the first embodiment, the voltage is applied to the corner portions LL, LR, UL and UR of the electrode 23, which is provided at four edges of the transparent conductive layer 22, alternately in the X-axis direction and in the Y-axis direction. When the transparent conductive layer 12 and the transparent conductive layer 22 are in contact at a point "A", an electric potential "Va" at the point "A" is detected via the transparent conductive layer 12 as shown in FIG. 5B. With this mechanism, coordinates of the point "A" in the X-axis direction and in the Y-axis direction are detected.

As shown in FIG. 4, the transparent conductive layer 12 of the upper electrode substrate 10 is divided into 32 conductive areas, where voltages are applied by time division for the respective conductive areas so that the conductive area including the touched position can be detected.

As described above, by forming the plural conductive areas by dividing the transparent conductive layer 12 of the upper electrode substrate 10, even when the upper electrode substrate 10 and the lower electrode substrate 20 are in contact at plural positions, the touched positions can be specified for each of the conductive areas of the transparent conductive layer 12 by the coordinate detection circuit 50. Thus, the touched positions of the respective conductive areas can be independently detected.

Specifically, as shown in FIG. 4, it is assumed that the transparent conductive layer 12 of the upper electrode substrate 10 and the transparent conductive layer 22 of the lower electrode substrate 20 are in contact at five points as shown by arrows A, B, C, D and E. At this time, the contacted points are in the different conductive areas from each other. Thus, it is possible to detect the contacted points independently.

For example, as shown in FIG. 4, when the upper electrode substrate 10 and the lower electrode substrate 20 are in contact at the point shown by the arrow A, it means that the conductive area 12a of the transparent conductive layer 12 is contacting the lower electrode substrate 20. Similarly, when the upper electrode substrate 10 and the lower electrode substrate 20 are in contact at the point shown by the arrow B, it means that the conductive area 12b of the transparent conductive layer 12 is contacting the lower electrode substrate 20. Similarly, when the contacting portion upper electrode substrate 10 and the lower electrode substrate 20 are in contact at the point shown by the arrow C, it means that the conductive area 12c of the transparent conductive layer 12 is contacted the lower electrode substrate 20. Similarly, when the contacted portion upper electrode substrate 10 and the lower electrode substrate 20 are in contact at the point shown by the arrow D, it means that the conductive area 12d of the transparent conductive layer 12 is contacting the lower electrode substrate 20. Similarly, when the upper electrode substrate 10 and the lower electrode substrate 20 are in contact at the point shown by the arrow E, it means that the conductive area 12e of the transparent conductive layer 12 is contacting the lower electrode substrate 20. In such a case, the conductive areas 12a, 12b, 12c, 12d and 12e of the transparent conductive layer 12 are insulated from each other, the contacted points can be independently detected.

Thus, it is possible to detect contacting points even when the upper electrode substrate 10 and the lower electrode substrate 20 are in contact at five points at the same time.

As described above, even when the transparent conductive layer 12 and the transparent conductive layer 22 are in contact at plural points, it is possible to detect the contacting conductive areas, and more accurate touching positions can be detected by detecting the electric potential distribution on the transparent conductive layer 22. Further, even when the contacting position is shifted, the shift of the contacting position can be recognized and more accurate touching positions can be detected by detecting the electric potential distribution on the transparent conductive layer 22.

Although in this embodiment, an example where the transparent conductive layer 12 is divided into 32 conductive areas is explained, the transparent conductive layer 12 may be divided into any other numbers, or the transparent conductive layer 12 may be a single conductive layer not being divided into plural conductive areas.

The structure of the lower electrode substrate 20 of the touch panel 100 of the first embodiment is explained in detail with reference to FIG. 6.

Figure 6:
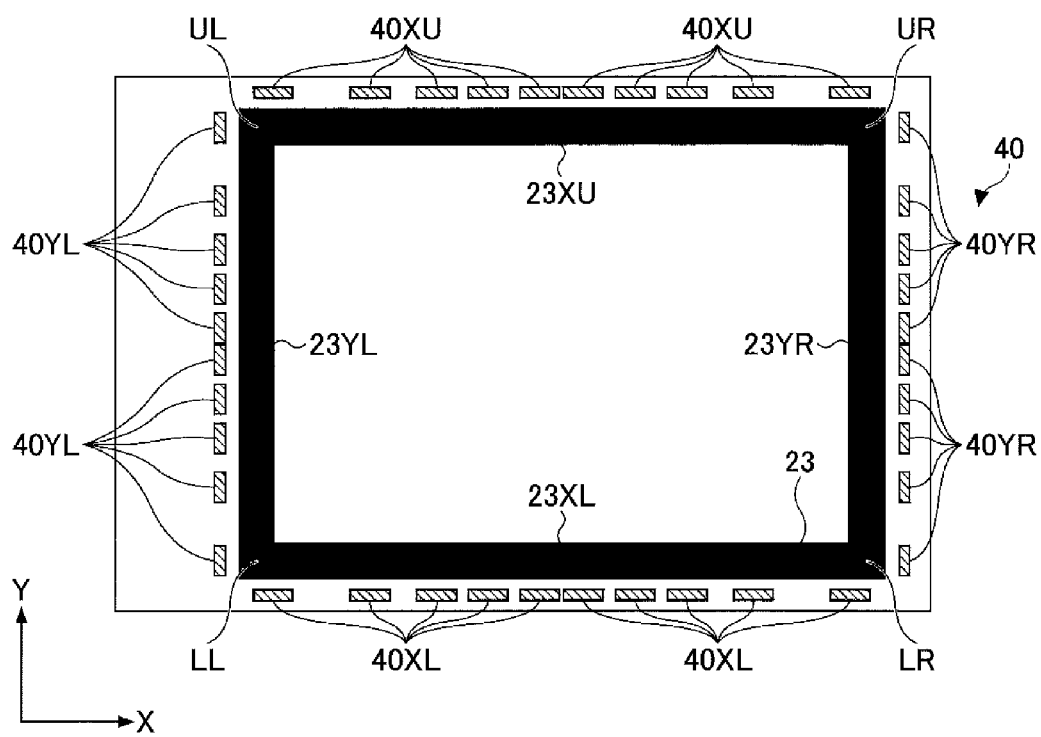
FIG. 6 is a plan view showing a pattern of the touch panel of the first embodiment including an electrode and a low-resistance unit.

FIG. 6 is a plan view showing a pattern of the touch panel 100 of the first embodiment including the electrode 23 and a resistance adjusting member 40 formed on the transparent conductive layer 22 of the lower electrode substrate 20. In the following, a length direction is referred to as an X-axis direction and a width direction is referred to as a Y-axis direction. The X-axis direction is an example of one of a first direction and a second direction and the Y-axis direction is an example of the other of the first direction and the second direction. In this embodiment, the X-axis direction and the Y-axis direction are substantially perpendicular to each other.

Hereinafter, the edges of the electrode 23 that has a rectangular ring shape in a plan view are referred to as electrode portions 23XL, 23XU, 23YL and 23YR. The electrode portion 23XL is positioned between the corner portion LL and the corner portion LR and extends in the X-axis direction. The electrode portion 23XU is positioned between the corner portion UL and the corner portion UR and extends in the X-axis direction. The electrode portion 23YL is positioned between the corner portion LL and the corner portion UL and extends in the Y-axis direction. The electrode portion 23YR is positioned between the corner portion LR and the corner portion UR and extends in the Y-axis direction.

In this embodiment, the resistance adjusting member 40 is formed on the transparent conductive layer 22 of the lower electrode substrate 20.

The resistance adjusting member 40 includes plural resistance portions (positioned at outside of the electrode 23 having the rectangular ring shape in a plan view. Specifically, the resistance adjusting member 40 includes resistance portions 40XL and 40XU which are aligned in the X-axis direction in the vicinity of the electrode portions 23XL and 23XU, respectively. The resistance adjusting member 40 further includes resistance portions 40YL and 40YR which are aligned in the Y-axis direction in the vicinity of the electrode portions 23YL and 23YR, respectively. In this embodiment, the resistance portions 40XL, 40XU, 40YL and 40YR are formed on the surface of the transparent conductive layer 22 to be in contact with the transparent conductive layer 22.

The electrode portions 23XL and 23XU are an example of one of a group including a first electrode and a second electrode and a group including a third electrode and a fourth electrode, and the electrode portions 23YL and 23YR are an example of the other of the groups.

The resistance portions 40XL, 40XU, 40YL and 40YR may be made by printing an Ag paste. The resistance value of the Ag paste may be about 1/10 of the resistance value of Ag—C which composes the electrode portions 23XL, 23XU, 23YL and 23YR. In other words, the resistance value of the resistance portions 40XL, 40XU, 40YL and 40YR is lower than that of the electrode portions 23XL, 23XU, 23YL and 23YR in this embodiment. Further, the resistance value of the electrode portions 23XL, 23XU, 23YL and 23YR is lower than that of the transparent conductive layer 22 in this embodiment.

In this embodiment, the resistance adjusting member 40 includes 10 resistance portions 40XL and 10 resistance portions 40XU, for example. In this embodiment, the length of the resistance portions 40XL and 40XU may be the same. Further in this embodiment, the length of each of the resistance portions 40XL and 40XU may be, for example, ⅟20 of the length of the electrode portions 23XL and 23XU.

In this embodiment, the resistance portions 40XL and 40XU are densely provided at a center and sparsely provided at edges (in other words, outer sides, same in the following) in a longitudinal (X-axis) direction of the electrode portions 23XL and 23XU, respectively.

In other words, the resistance portions 40XL and 40XU are provided such that a space between the adjacent resistance portions 40XL and 40XU is small at the center and large at the edges in the longitudinal direction of the electrode portions 23XL and 23XU, respectively.

The resistance portions 40XL are positioned in the vicinity of the electrode portion 23XL on the transparent conductive layer 22. Thus, by providing the resistance portions 40XL as described above, combined resistance values of the electrode portion 23XL and the resistance portions 40XL in the Y-axis direction become lower at the center and higher at the edges in the longitudinal direction of the electrode portion 23XL.

Similarly, the resistance portions 40XU are positioned in the vicinity of the electrode portion 23XU on the transparent conductive layer 22. Thus, by providing the resistance portions 40XU as described above, combined resistance values of the electrode portion 23XU and the resistance portions 40XU in the Y-axis direction become lower at the center and higher at the edges in the longitudinal direction of the electrode portion 23XU.

Similarly in this embodiment, the resistance adjusting member 40 includes 10 resistance portions 40YL and 10 resistance portions 40YR, for example. In this embodiment, the length of the resistance portions 40YL and 40YR may be the same. Further in this embodiment, the length of each of the resistance portions 40YL and 40YR may be, for example, ⅟20 of the length of the electrode portions 23YL and 23YR.

In this embodiment, the resistance portions 40YL and 40YR are densely provided at a center and sparsely provided at edges in a longitudinal direction (Y-axis) of the electrode portions 23YL and 23YR, respectively.

In other words, the resistance portions 40YL and 40YR are provided such that a space between the adjacent resistance portions 40YL and 40YR is small at the center and large at the edges in the longitudinal direction of the electrode portions 23YL and 23YR.

The resistance portions 40YL are positioned in the vicinity of the electrode portion 23YL on the transparent conductive layer 22. Thus, by providing the resistance portions 40YL as described above, combined resistance values of the electrode portion 23YL and the resistance portions 40YL in the X-axis direction become lower at the center and higher at the edges in the longitudinal direction of the electrode portion 23YL.

Similarly, the resistance portions 40YR are positioned in the vicinity of the electrode portion 23YR on the transparent conductive layer 22. Thus, by providing the resistance portions 40YR as described above, combined resistance values of the electrode portion 23YR and the resistance portions 40YR in the X-axis direction become lower at the center and higher at the edges in the longitudinal direction of the electrode portion 23YR.

The resistance portions 40XL and 40XU are an example of one of a group including a first resistance portion and a second resistance portion and a group including a third resistance portion and a fourth resistance portion. The resistance portions 40YL and 40YR are an example of the other of the groups.

As described above, by providing the resistance portions 40XL, 40XU, 40YL and 40YR to be densely arranged at the center and sparsely arranged at the edges of the longitudinal direction of the electrode portions 23XL, 23XU, 23YL and 23YR, respectively, the combined resistance values of the electrode portions 23XL, 23XU, 23YL and 23YR and the resistance portions 40XL, 40XU, 40YL and 40YR become lower at the center and higher at the edges in the longitudinal directions of the electrode portions 23XL, 23XU, 23YL and 23YR. With this, distortion of the electric potential distribution on the transparent conductive layer 22 can be reduced.

A relative example in which an electric potential distribution generated on a lower electrode substrate 20A which does not include the resistance portions 40XL, 40XU, 40YL and 40YR is explained with reference to FIG. 7A and FIG. 7B.

FIG. 7A and FIG. 7B are plan views showing an electric potential distribution generated on the lower electrode substrate 20A of the relative example.

As shown in FIG. 7A, when the voltage of 5 V is applied to the corner portions LL and UL while the corner portions LR and UR are kept at 0 V, an electric potential distribution is generated in the X-axis direction. At this time, equipotential lines on the transparent conductive layer 22 become as shown by lines in FIG. 7A. The equipotential lines are rather straight along the Y-axis at the center part in the X-axis direction. However, the equipotential lines are curved with respect to the Y-axis at the edges in the X-axis direction.

The reason that the equipotential lines are curved with respect to the Y-axis at the edges in the X-axis direction is considered to be as follows. When the voltages as described above are applied to the electrode portions 23YL and 23YR, the electric potential distribution in the X-axis direction is generated between the electrode portions 23YL and 23YR. At this time, as the electrode portions 23YL and 23YR are electrically connected by the electrode portions 23XL and 23XU, the electrode portions 23XL and 23XU near the corner portions LL and LR, and UL and UR are affected by the applied voltages. Here, as the resistance values of the electrode portions 23XL and 23XU are lower than that of the transparent conductive layer 22, the distortion of the electric potential distribution on the transparent conductive layer 22 is generated.

Similarly, as shown in FIG. 7B, when the voltage of 5 V is applied to the corner portions UL and UR while the corner portions LL and LR are kept at 0 V, an electric potential distribution is generated in the Y-axis direction. At this time, equipotential lines on the transparent conductive layer 22 become as shown by lines in FIG. 7B. The equipotential lines are rather straight along the X-axis at the center part in the Y-axis direction. However, the equipotential lines are curved with respect to the X-axis at the edges in the Y-axis direction.

The reason that the equipotential lines are curved with respect to the X-axis at edges in the Y-axis direction is considered to be as follows. When the voltages as described above are applied to the electrode portions 23XL and 23XU, the electric potential distribution in the Y-axis direction is generated between the electrode portions 23XL and 23XU. At this time, as the electrode portions 23XL and 23XU are electrically connected by the electrode portions 23YL and 23YR, the electrode portions 23YL and 23YR near the corner portions LL and UL, and LR and UR are affected by the applied voltages. Here, as the resistance values of the electrode portions 23YL and 23YR are lower than that of the transparent conductive layer 22, the distortion of the electric potential distribution on the transparent conductive layer 22 is generated.

As described above, at the lower electrode substrate 20A of the relative example, a problem occurs that the distortion of the electric potential distribution in the X-axis direction or the Y-axis direction is generated when the voltages are applied in the X-axis direction or in the Y-axis direction, respectively.

On the other hand, for the lower electrode substrate 20 of the touch panel 100 of the first embodiment, as described above, the resistance portions 40XL and 40XU are densely provided at the center and sparsely provided at the edges in the longitudinal direction of the electrode portions 23XL and 23XU, respectively. Thus, the combined resistance values of the resistance portions 40XL and 40XU and the electrode portions 23XL and 23XU in the X-axis direction are set lower at the center and higher at the edges in the longitudinal direction of the electrode portions 23XL and 23XU, respectively.

By setting the combined resistance values lower at the center and higher at the edges in the longitudinal direction of the electrode portions 23XL and 23XU, the electric potential gradients in the X-axis direction become sharper at the edges than at the center so that the equipotential lines are not curved even at the edges.

Similarly for the Y-axis direction, for the lower electrode substrate 20 of the touch panel 100 of the first embodiment, as described above, the resistance portions 40YL and 40YR are densely provided at the center and sparsely provided at the edges in the longitudinal direction of the electrode portions 23YL and 23YR, respectively. Thus, the combined resistance values of the resistance portions 40YL and 40YR and the electrode portions 23YL and 23YR in the Y-axis direction are set lower at the center and higher at the edges in the longitudinal direction of the electrode portions 23YL and 23YR, respectively.

By setting the combined resistance values lower at the center and higher at the edges in the longitudinal direction of the electrode portions 23YL and 23YR, the electric potential gradients in the Y-axis direction become sharper at the edges than at the center so that the equipotential lines are not curved even at the edges.

Figure 8A:
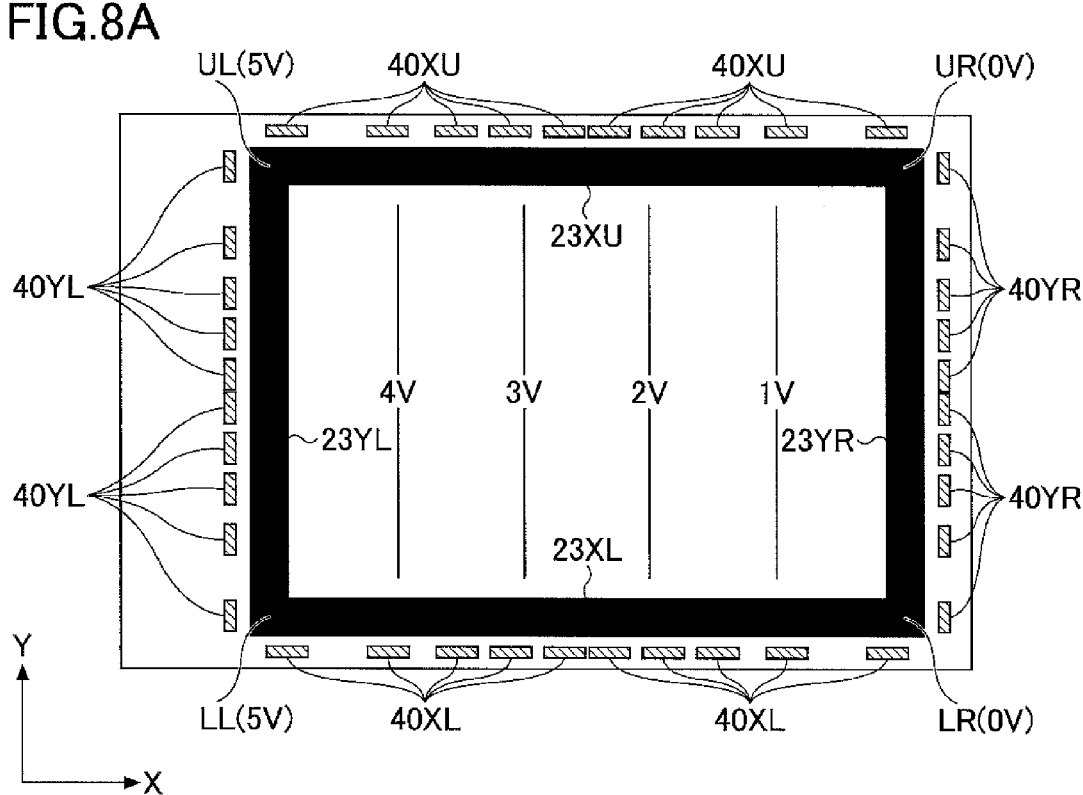
FIG. 8A and FIG. 8B are views showing equipotential lines on a lower electrode substrate of the touch panel of the first embodiment.
Figure 8B:
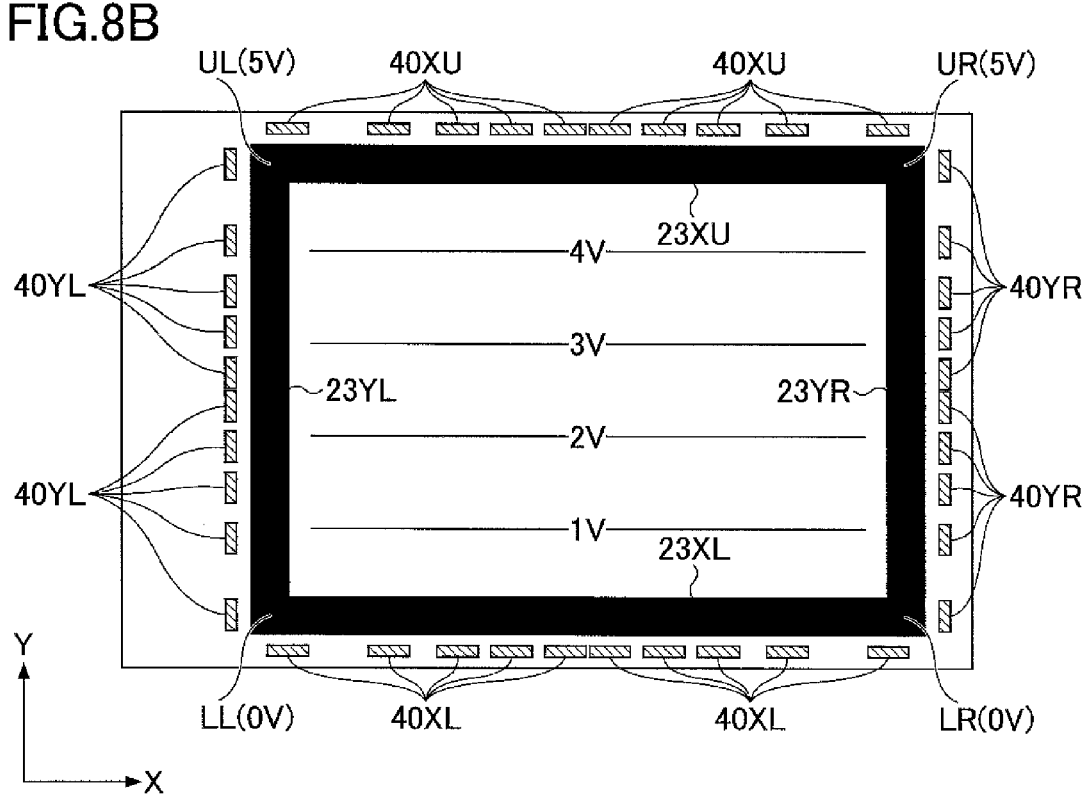

Thus, according to the lower electrode substrate 20 of the touch panel 100 of the first embodiment, the equipotential lines become as lines shown in FIG. 8A and FIG. 8B.

FIG. 8A and FIG. 8B are views showing equipotential lines on the lower electrode substrate 20 of the touch panel 100 of the first embodiment.

As shown in FIG. 8A, when the voltage of 5 V is applied to the corner portions LL and UL while the corner portions LR and UR are kept at 0 V, an electric potential distribution is generated in the X-axis direction where the equipotential lines on the transparent conductive layer 22 are as shown by the lines.

The equipotential lines of 4 V, 3 V, 2 V, and 1 V are shown in FIG. 8A. All of the equipotential lines, even for the equipotential lines at the edges in the X-axis direction, are straight along the Y-axis.

This is because the distortion of the electric potential distribution on the transparent conductive layer 22 is corrected to be reduced as follows. By setting the combined resistance values of the electrode portions 23YL and 23YR and the resistance portions 40YL and 40YR lower at the center than the edges in the longitudinal direction, the electric potential gradients in the X-axis direction become sharper at the edges than at the center so that the equipotential lines are not curved even at the edges.

As shown in FIG. 8B, when the voltage of 5 V is applied to the corner portions UL and UR while the corner portions LL and LR are kept at 0 V, an electric potential distribution is generated in the Y-axis direction where the equipotential lines on the transparent conductive layer 22 are as shown by the lines.

The equipotential lines of 4 V, 3 V, 2 V and 1 V are shown in FIG. 8B. All of the equipotential lines, even for the equipotential lines at the edges in the Y-axis direction, are straight along the X-axis.

This is because the distortion of the electric potential distribution on the transparent conductive layer 22 is corrected to be reduced as follows. By setting the combined resistance values of the electrode portions 23XL and 23XU and the resistance portions 40XL and 40XU lower at the center than the edges in the longitudinal direction, the electric potential gradients in the Y-axis direction become sharper at the edges than at the center so that the equipotential lines are not curved even at the edges.

According to the touch panel 100 of the first embodiment, by providing the resistance portions 40XL, 40XU, 40YL and 40YR to be densely arranged at the center and sparsely arranged at the edges of the longitudinal direction of the electrode portions 23XL, 23XU, 23YL and 23YR, respectively, the distortion of the electric potential distribution on the transparent conductive layer 22 of the lower electrode substrate 20 can be reduced.

For the lower electrode substrate 20 of the touch panel 100 of the first embodiment, the resistance portions 40XL, 40XU, 40YL and 40YR are formed on the transparent conductive layer 22 in addition to the electrode 23. The resistance portions 40XL, 40XU, 40YL and 40YR have a function to assist the electrode 23 in generation of the electric potential distributions in the X-axis direction and in the Y-axis direction, respectively.

Thus, the electrode 23 of the touch panel 100 of the first embodiment may be formed to have a width smaller than that of the electrode 23 of the lower electrode substrate 20A of the relative example (see FIG. 7).

Thus, the total width of the electrode 23 and the resistance portions 40XL, 40XU, 40YL and 40YR, respectively of the lower electrode substrate 20 of the first embodiment may be set to be less than or equal to that of the electrode 23 of the lower electrode substrate 20A of the relative example. By this structure, the size of a display area of the touch panel 100 can be maintained to be large even when providing the resistance portions 40XL, 40XU, 40YL and 40YR.

Further, it is explained that the length of each of the resistance portions 40XL, 40XU, 40YL and 40YR may be ½0 of the electrode portions 23XL, 23XU, 23YL and 23YR, respectively, and 10 of each of the resistance portions 40XL, 40XU, 40YL and 40YR may be provided. The length of each of the resistance portions 40XL, 40XU, 40YL and 40YR and the numbers of each of the resistance portions 40XL, 40XU, 40YL and 40YR may not limited to the example, and may be arbitrarily set based on the size or shape of the lower electrode substrate 20 and the transparent conductive layer 22, for example.

Further, the numbers of each of the resistance portions 40XL, 40XU, 40YL and 40YR may not be equal to each other. For example, the numbers of the resistance portions 40XL and 40XU which are aligned in the X-axis direction and the numbers of the resistance portions 40YL and 40YR which are aligned in the Y-axis direction may not be the same.

Although not shown in the drawings, an insulating layer may be formed on the electrode portions 23XL, 23XU, 23YL and 23YR and the resistance portions 40XL, 40XU, 40YL and 40YR formed on the lower electrode substrate 20 of the touch panel 100 of the first embodiment, and interconnect portions for applying voltages to the corner portions LL, UL, LR and UR of the electrode 23 may be formed on the insulating layer. Thus, a group including the resistance portions 40XL, 40XU, and a group including the resistance portions 40YL, 40YR are insulated from each other by the insulating layer. Then, another insulating layer may be formed on the interconnect portions so that the interconnect portions or the like are insulated from the transparent conductive layer 12 of the upper electrode substrate 10. The insulating layer formed on the electrode portions 23XL, 23XU, 23YL and 23YR and the resistance portions 40XL, 40XU, 40YL and 40YR and the other insulating layer formed on the above described interconnects may not be formed on a display area, which is inside of the electrode portions 23XL, 23XU, 23YL and 23YR of the touch panel 100.

(Second Embodiment)

Figure 9:
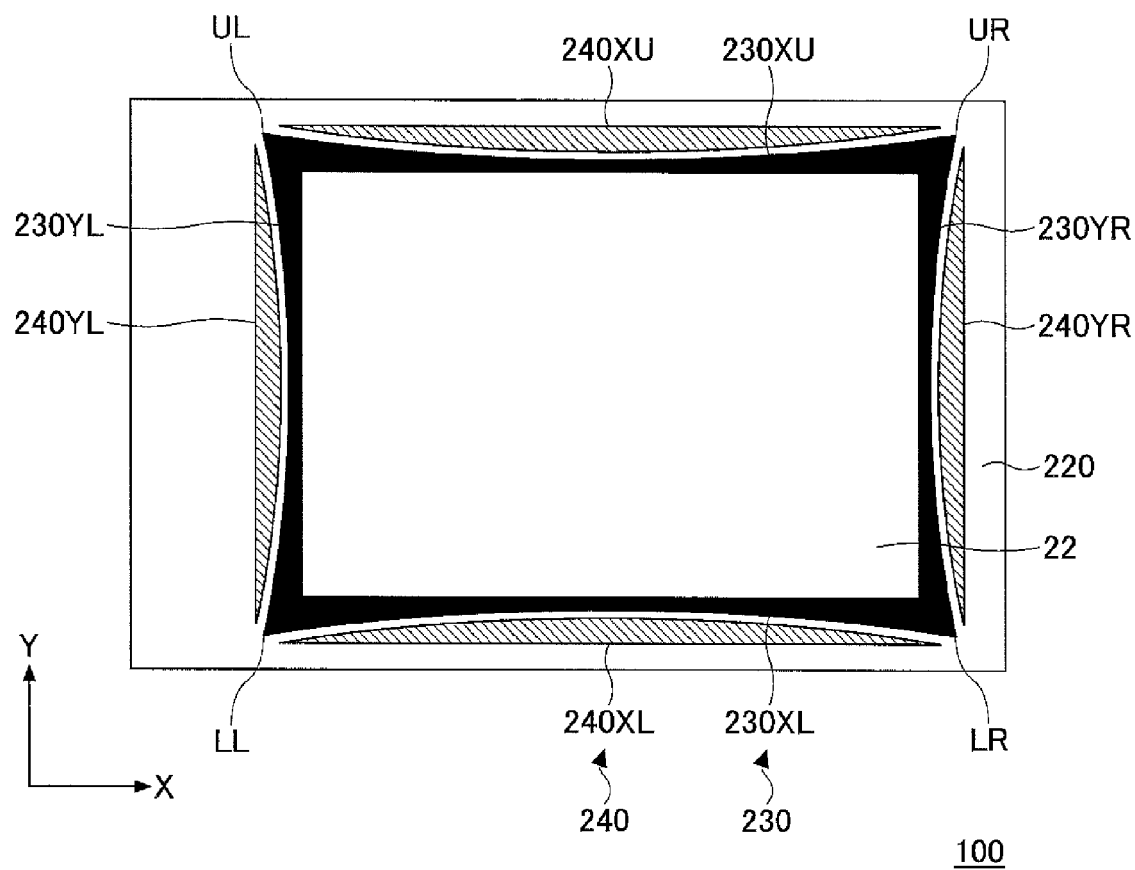
FIG. 9 is a plan view showing an example of a structure of a lower electrode substrate of the touch panel of a second embodiment.

FIG. 9 is a plan view showing an example of a structure of a lower electrode substrate 220 of the touch panel 100 of the second embodiment. Although the structure of the lower electrode substrate 220 of the touch panel of the second embodiment is different from that of the touch panel 100 of the first embodiment, the rest of the parts are the same. Thus, only the explanation of the lower electrode substrate 220 of the touch panel 100 of the second embodiment is explained with reference to FIG. 9.

The lower electrode substrate 220 includes the transparent conductive layer 22, an electrode 230 formed on the transparent conductive layer 22 and a resistance adjusting member 240 formed also on the transparent conductive layer 22.

The electrode 230 includes electrode portions 230XL, 230XU, 230YL and 230YR which are formed to have a rectangular ring shape in a plan view. The electrode portion 230XL is positioned between the corner portion LL and the corner portion LR and extends in the X-axis direction. The electrode portion 230XU is positioned between the corner portion UL and the corner portion UR and extends in the X-axis direction. The electrode portion 230YL is positioned between the corner portion LL and the corner portion UL and extends in the Y-axis direction. The electrode portion 230YR The electrode portion 23YR is positioned between the corner portion LR and the corner portion UR and extends in the Y-axis direction.

The electrode portions 230XL, 230XU, 230YL and 230YR are formed to be narrower at the center in the longitudinal direction such that the outer edges are curved so that the width becomes wider toward the edges in the longitudinal directions. The inner edges of the electrode portion 230XL, 230XU, 230YL and 230YR are formed to be straight.

The electrode portion 230XL, 230XU, 230YL and 230YR may be made of a conductive material such as Ag—C, Ag or the like, for example. In this embodiment, an example where the electrode portion 230XL, 230XU, 230YL and 230YR are made of Ag—C is explained.

The resistance adjusting member 240 is positioned at an outside of the electrode portions 230XL, 230XU, 230YL and 230YR of the electrode 230. The resistance adjusting member 240 includes resistance portions 240XL and 240XU which are aligned in the X-axis direction in the vicinity of the electrode portions 230XL and 230XU, respectively. The resistance adjusting member 240 further includes resistance portions 240YL and 240YR which are aligned in the Y-axis direction in the vicinity of the electrode portions 230YL and 230YR, respectively.

The resistance portions 240XL, 240XU, 240YL and 240YR may made by printing an Ag paste. The resistance value of the Ag paste may be about 1/10 of the resistance value of Ag—C which composes the electrode portions 230XL, 230XU, 230YL and 230YR. In other words, the resistance value of the resistance portions 240XL, 240XU, 240YL and 240YR is lower than that of the electrode portions 230XL, 230XU, 230YL and 230YR in this embodiment. Further, the resistance value of the electrode portions 230XL, 230XU, 230YL and 230YR is lower than that of the transparent conductive layer 22 in this embodiment.

The resistance portions 240XL and 240XU are formed to be wider at the center and narrower at the edges in the longitudinal direction of the electrode portions 230XL and 230XU, respectively. The inner edges of the resistance portions 240XL and 240XU are curved to correspond to the outer edges of the electrode portions 230XL and 230, respectively. The outer edges of the resistance portions 240XL and 240XU are formed to be straight.

Here, for example, the electrode portions 230XL and 230XU and the resistance portions 240XL and 240XU may be formed to have the same thickness (the height from the surface of the transparent conductive layer 22). The widths of the resistance portions 240XL and 240XU in the Y-axis direction at the center in the longitudinal direction may be set 1.5 times of that of the electrode portions 230XL and 230XU at the center in the longitudinal direction, respectively, for example. The widths of the resistance portions 240XL and 240XU in the Y-axis direction become gradually narrower from the center to the edges to be zero at the ends of the electrode portions 230XL and 230XU in the longitudinal direction, respectively.

The resistance portion 240XL is positioned in the vicinity of the electrode portion 230XL on the transparent conductive layer 22. Thus, by providing the resistance portion 240XL as described above, combined resistance values of the electrode portion 230XL and the resistance portions 240XL in the Y-axis direction become lower at the center and higher at the edges in the longitudinal direction of the electrode portion 230XL.

Similarly, the resistance portion 240XU is positioned in the vicinity of the electrode portion 230XU on the transparent conductive layer 22. Thus, by providing the resistance portion 240XU as described above, combined resistance values of the electrode portion 230XU and the resistance portion 240XU in the Y-axis direction become lower at the center and higher at the edges in the longitudinal direction of the electrode portion 230XU.

Similarly, the resistance portions 240YL and 240YR are formed to be wider at the center and narrower at the edges in the longitudinal direction of the electrode portions 230YL and 230YR, respectively. The inner edges of the resistance portions 240YL and 240YR are curved to correspond to the outer edges of the electrode portions 230YL and 230YR, respectively. The outer edges of the resistance portions 240YL and 240YR are formed to be straight.

Thus, the inner edges of the electrode portions 230XL, 230XU, and 230YL, 230YR and the outer edges of the resistance portions 240XL, 240XU and 240YL, 240YR may be formed to be parallel with each other, respectively.

Here, for example, the electrode portions 230YL and 230YR and the resistance portions 240YL and 240YR may be formed to have the same thickness (the height from the surface of the transparent conductive layer 22). The widths of the resistance portions 240YL and 240YR at the center in the longitudinal direction may be set 1.5 times of that of the electrode portions 230YL and 230YR in the X-axis direction at the center in the longitudinal direction, respectively, for example. The widths of the resistance portions 240YL and 240YR in the X-axis direction become gradually narrower from the center to the edges to be zero at the ends of the electrode portions 230YL and 230YR in the longitudinal direction, respectively.

The resistance portion 240YL is positioned in the vicinity of the electrode portion 230YL on the transparent conductive layer 22. Thus, by providing the resistance portion 240YL as described above, combined resistance values of the electrode portion 230YL and the resistance portion 240YL in the X-axis direction become lower at the center and higher at the edges in the longitudinal direction of the electrode portion 230YL.

Similarly, the resistance portion 240YR is positioned in the vicinity of the electrode portion 230YR on the transparent conductive layer 22. Thus, by providing the resistance portion 240YR as described above, combined resistance values of the electrode portion 230YR and the resistance portion 240YR in the X-axis direction become lower at the center and higher at the edges in the longitudinal direction of the electrode portion 230YR.

The resistance portions 240XL and 240XU are an example of one of a group including a first resistance portion and a second resistance portion and a group including a third resistance portion and a fourth resistance portion. The resistance portions 240YL and 240YR are an example of the other of the groups.

As described above, by providing the resistance portions 240XL, 240XU, 240YL and 240YR to be densely arranged at the center and sparsely arranged at the edges of the longitudinal direction of the electrode portions 230XL, 230XU, 230YL and 230YR, respectively, the combined resistance values of the electrode portions 230XL, 230XU, 230YL and 230YR and the resistance portions 240XL, 240XU, 240YL and 240YR become lower at the center and higher at the edges in the longitudinal directions of the electrode portions 230XL, 230XU, 230YL and 230YR. With this, distortion of the electric potential distribution on the transparent conductive layer 22 can be reduced.

Thus, according to the lower electrode substrate 220 of the touch panel 100 of the second embodiment, similar to the lower electrode substrate 20 of the touch panel 100 of the first embodiment, the distortion of the electric potential distribution can be reduced (see FIG. 8A and FIG. 8B).

By setting the combined resistance values of the electrode portions 230XL and 230XU and the resistance portions 240XL and 240XU lower at the center and higher at the edges in the longitudinal direction, respectively, the electric potential gradients in the Y-axis direction become sharper at the edges than at the center so that the equipotential lines are not curved even at the edges.

Further, by setting the combined resistance values of the electrode portions 230YL and 230YR and the resistance portions 240YL and 240YR lower at the center and higher at the edges in the longitudinal direction, respectively, the electric potential gradients in the X-axis direction become sharper at the edges than at the center so that the equipotential lines are not curved even at the edges.

According to the lower electrode substrate 220 of the touch panel 100 of the second embodiment, similar to the lower electrode substrate 20 of the touch panel 100 of the first embodiment, uniform electric potential distributions can be obtained in the X-axis direction and in the Y-axis direction.

(Third Embodiment)

Figure 10:
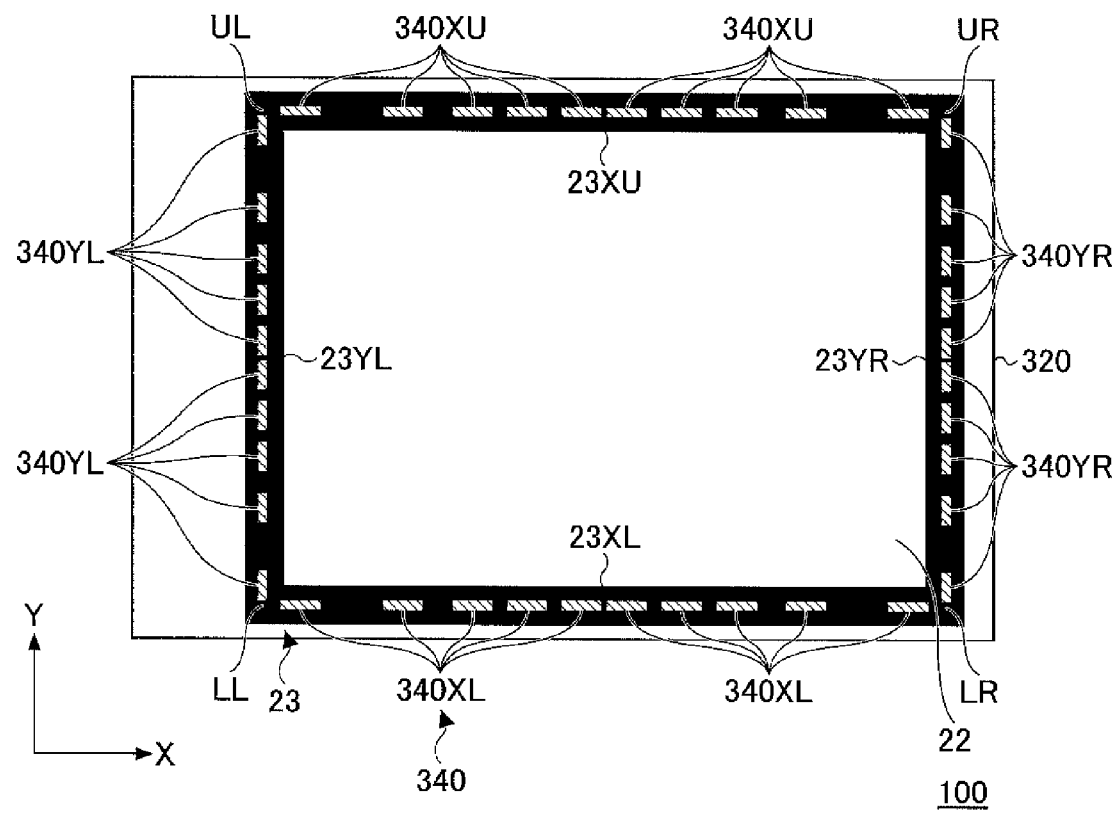
FIG. 10 is a plan view showing an example of a structure of a lower electrode substrate of the touch panel of a third embodiment.

FIG. 10 is a plan view showing an example of a structure of a lower electrode substrate 320 of the touch panel 100 of the third embodiment. Although the structure of the lower electrode substrate 320 of the touch panel of the third embodiment is different from that of the touch panel 100 of the first embodiment, the rest of the parts are the same. Thus, only the explanation of the lower electrode substrate 320 of the touch panel 100 of the third embodiment is explained with reference to FIG. 10.

The lower electrode substrate 320 includes a resistance adjusting member 340 formed on the electrode 23 and including plural resistance portions similar to those of the resistance portions of the resistance adjusting member 40 of the first embodiment.

The lower electrode substrate 320 includes the transparent conductive layer 22, the electrode 23 formed on the transparent conductive layer 22 and the resistance adjusting member 340 formed on the electrode 23.

The electrode 23 is the same as that of the lower electrode substrate 20 of the first embodiment, and includes the electrode portions 23XL, 23XU, 23YL and 23YR.

The resistance adjusting member 340 includes resistance portions 340XL, 340XU, 340YL and 340YR.

Similar to the resistance portions 40XL, 40XU, 40YL and 40YR of the resistance adjusting member 40, 10 of each of the resistance portions 340XL, 340XU, 340YL and 340YR are provided.

The resistance portions 340XL, 340XU, 340YL and 340YR may be made by printing an Ag paste. The resistance value of the Ag paste may be about 1/10 of the resistance value of Ag—C which composes the electrode portions 23XL, 23XU, 23YL and 23YR. In other words, the resistance value of the resistance portions 340XL, 340XU, 340YL and 340YR is lower than that of the electrode portions 23XL, 23XU, 23YL and 23YR in this embodiment. Further, the resistance value of the electrode portions 23XL, 23XU, 23YL and 23YR is lower than that of the transparent conductive layer 22 in this embodiment.

In this embodiment, the resistance adjusting member 340 includes 10 resistance portions 340XL and 10 resistance portions 340XU, for example as described above. In this embodiment, the length of the resistance portions 340XL and 340XU may be the same. Further in this embodiment, the length of each of the resistance portions 340XL and 340XU may be, for example, 1/20 of the length of the electrode portions 23XL and 23XU.

In this embodiment, the resistance portions 340XL and 340XU are densely provided at a center and sparsely provided at edges in the longitudinal direction of the electrode portions 23XL and 23XU, respectively.

In other words, the resistance portions 340XL and 340XU are provided such that a space between the adjacent resistance portions 340XL and 340XU is small at the center and large at the edges in the longitudinal direction of the electrode portions 23XL and 23XU, respectively.

The resistance portions 340XL are positioned in the vicinity of the electrode portion 23XL on the transparent conductive layer 22. Thus, by providing the resistance portions 340XL as described above, combined resistance values of the electrode portion 23XL and the resistance portions 340XL in the Y-axis direction become lower at the center and higher at the edges in the longitudinal direction of the electrode portion 23XL.

Similarly, the resistance portions 340XU are positioned in the vicinity of the electrode portion 23XU on the transparent conductive layer 22. Thus, by providing the resistance portions 340XU as described above, combined resistance values of the electrode portion 23XU and the resistance portions 340XU in the Y-axis direction become lower at the center and higher at the edges in the longitudinal direction of the electrode portion 23XU.

Similarly in this embodiment, the resistance adjusting member 340 includes 10 resistance portions 340YL and 10 resistance portions 340YR, for example. In this embodiment, the length of the resistance portions 340YL and 340YR may be the same. Further in this embodiment, the length of each of the resistance portions 340YL and 340YR may be, for example, 1/20 of the length of the electrode portions 23YL and 23YR.

In this embodiment, the resistance portions 340YL and 340YR are densely provided at a center and sparsely provided at edges in the longitudinal direction of the electrode portions 23YL and 23YR, respectively.

In other words, the resistance portions 340YL and 340YR are provided such that a space between the adjacent resistance portions 340YL and 340YR is small at the center and large at the edges in the longitudinal direction of the electrode portions 23YL and 23YR.

The resistance portions 340YL are positioned in the vicinity of the electrode portion 23YL on the transparent conductive layer 22. Thus, by providing the resistance portions 340YL as described above, combined resistance values of the electrode portion 23YL and the resistance portions 340YL in the X-axis direction become lower at the center and higher at the edges in the longitudinal direction of the electrode portion 23YL.

Similarly, the resistance portions 340YR are positioned in the vicinity of the electrode portion 23YR on the transparent conductive layer 22. Thus, by providing the resistance portions 340YR as described above, combined resistance values of the electrode portion 23YR and the resistance portions 340YR in the X-axis direction become lower at the center and higher at the edges in the longitudinal direction of the electrode portion 23YR.

The resistance portions 340XL and 340XU are an example of one of a group including a first resistance portion and a second resistance portion and a group including a third resistance portion and a fourth resistance portion. The resistance portions 340YL and 340YR are an example of the other of the groups.

As described above, by providing the resistance portions 340XL, 340XU, 340YL and 340YR to be densely arranged at the center and sparsely arranged at the edges of the longitudinal direction of the electrode portions 23XL, 23XU, 23YL and 23YR, respectively, the combined resistance values of the electrode portions 23XL, 23XU, 23YL and 23YR and the resistance portions 340XL, 340XU, 340YL and 340YR become lower at the center and higher at the edges in the longitudinal direction of the electrode portions 23XL, 23XU, 23YL and 23YR. With this, distortion of the electric potential distribution on the transparent conductive layer 22 can be reduced.

Thus, according to the lower electrode substrate 320 of the touch panel 100 of the third embodiment, similar to the lower electrode substrate 20 of the touch panel 100 of the first embodiment, the distortion of the electric potential distribution can be reduced (see FIG. 8A and FIG. 8B).

By setting the combined resistance values of the electrode portions 23XL and 23XU and the resistance portions 340XL and 340XU lower at the center and higher at the edges in the longitudinal direction, respectively, the electric potential gradients in the Y-axis direction become sharper at the edges than at the center so that the equipotential lines are not curved even at the edges.

Further, by setting the combined resistance values of the electrode portions 23YL and 23YR and the resistance portions 340YL and 340YR lower at the center and higher at the edges in the longitudinal direction, respectively, the electric potential gradients in the X-axis direction become sharper at the edges than at the center so that the equipotential lines are not curved even at the edges.

According to the lower electrode substrate 320 of the touch panel 100 of the third embodiment, similar to the lower electrode substrate 20 of the touch panel 100 of the first embodiment, uniform electric potential distributions can be obtained in the X-axis direction and in the Y-axis direction.

(Fourth Embodiment)

Figure 11:
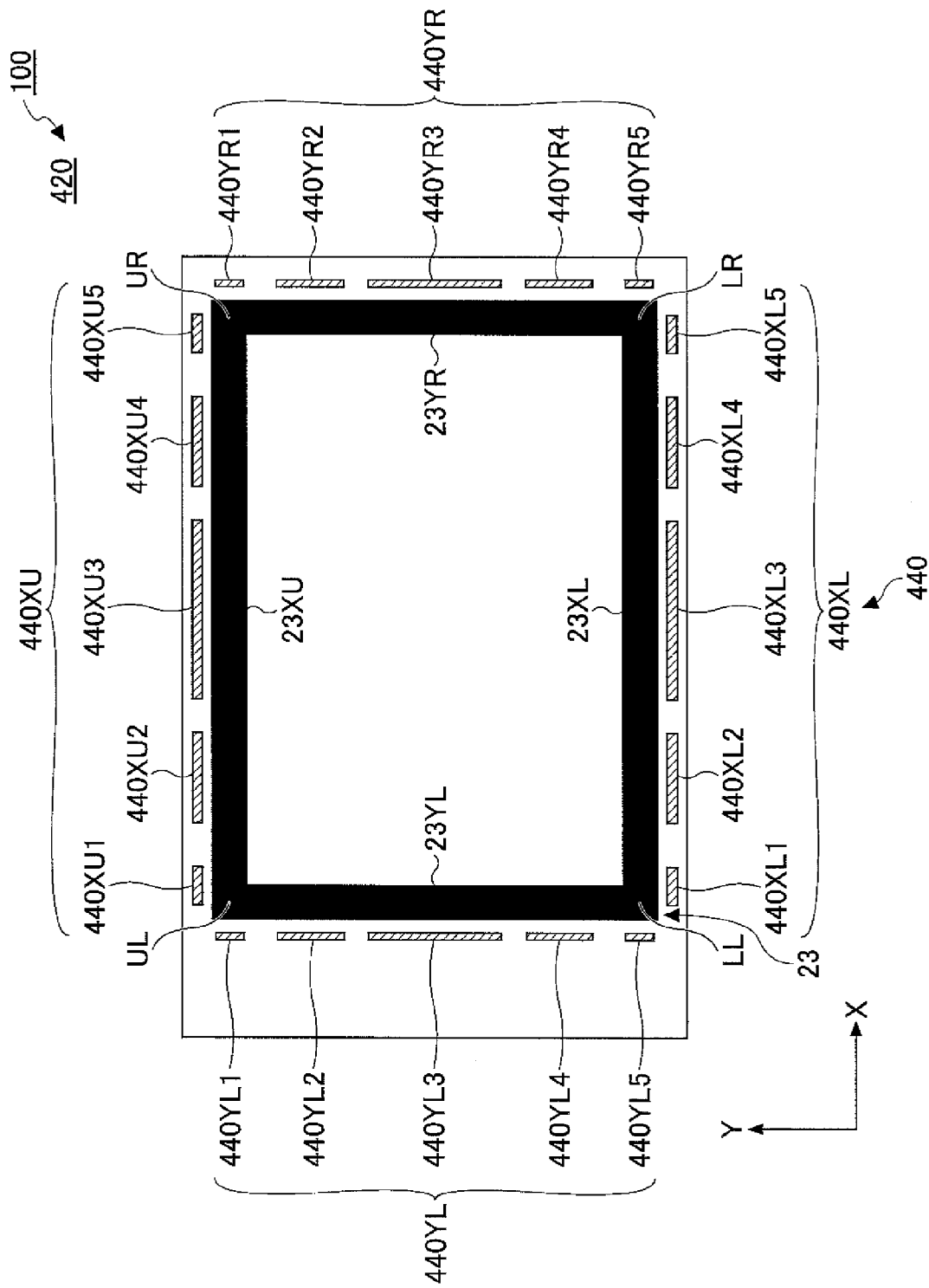
FIG. 11 is a plan view showing an example of a structure of a lower electrode substrate of the touch panel of a fourth embodiment.

FIG. 11 is a plan view showing an example of a structure of a lower electrode substrate 420 of the touch panel 100 of the fourth embodiment. Although the structure of the lower electrode substrate 420 of the touch panel of the fourth embodiment is different from that of the touch panel 100 of the first embodiment, the rest of the parts are the same. Thus, only the explanation of the lower electrode substrate 420 of the touch panel 100 of the fourth embodiment is explained with reference to FIG. 11.

The lower electrode substrate 420 includes the transparent conductive layer 22, the electrode 23 formed on the transparent conductive layer 22, and a resistance adjusting member 440 formed on the transparent conductive layer 22 and positioned at the outside of the electrode 23.

The resistance adjusting member 440 has a similar structure as the resistance adjusting member 40 of the first embodiment, and includes resistance portions 440XL, 440XU, 440YL, 440YR. However, in this embodiment, the lengths of the resistance portions composing each of the resistance portions 440XL, 440XU, 440YL, 440YR are not the same.

The electrode 23 is the same as the electrode 23 of the lower electrode substrate 20 of the first embodiment, and includes the electrode portions 23XL, 23XU, 23YL and 23YR.

Here, the resistance portions 440XL are positioned along the electrode 23XL. The resistance portions 440XL are referred to as resistance portions 440XL1, 440XL2, 440XL3, 440XL4 and 440XL5, which are aligned in this order from the corner portion LL to the corner portion LR. Among the resistance portions 440XL1, 440XL2, 440XL3, 440XL4 and 440XL5, the resistance portion 440XL3, which is positioned at the center in the X-axis direction, has the longest length, and the resistance portions 440XL1 and 440XL5, which are positioned at the edges in the X-axis direction, have the shortest length where the length of the resistance portions 440XL1 and 440XL5 is about 1/4 of that of the resistance portion 440XL3, for example.

The length of the resistance portions 440XL2 and 440XL4, which are positioned between the resistance portion 440XL3 and the resistance portions 440XL1 and 440XL5, respectively, is about middle of the length of the resistance portion 440XL3 and the length of the resistance portions 440XL1 and 440XL5, and may be about 1/2 of that of the resistance portion 440XL3, for example.

The resistance portions 440XL1, 440XL2, 440XL3, 440XL4 and 440XL5 are formed to have the same thickness (height from a surface of the transparent conductive layer 22). Further, in this embodiment, the resistance portions 440XL1, 440XL2, 440XL3, 440XL4 and 440XL5 may be positioned such that a space between the adjacent resistance portions becomes the same.

By providing the resistance portions 440XL1, 440XL2, 440XL3, 440XL4 and 440XL5 such that the closer to the center in the X-axis direction, the longer the length of the resistance portion becomes, the combined resistance values of the electrode portion 23XL and the resistance portions 440XL in the Y-axis direction become lower at the center and higher at the edges in the longitudinal direction of the electrode portion 23XL.

Similarly, the resistance portions 440XU are positioned along the electrode 23XU. The resistance portions 440XU are referred to as resistance portions 440XU1, 440XU2, 440XU3, 440XU4 and 440XU5, which are aligned in this order from the corner portion UL to the corner portion UR. Among the resistance portions 440XU1, 440XU2, 440XU3, 440XU4 and 440XU5, the resistance portion 440XU3, which is positioned at the center in the X-axis direction, has the longest length, and the resistance portions 440XU1 and 440XU5, which are positioned at the edges in the X-axis direction, have the shortest length where the length of the resistance portions 440XU1 and 440XU5 is about ¼ of that of the resistance portion 440XU3, for example.

The length of the resistance portions 440XU2 and 440XU4, which are positioned between the resistance portion 440XU3 and the resistance portions 440XU1 and 440XU5, respectively, is about middle of the length of the resistance portion 440XU3 and the length of the resistance portions 440XU1 and 440XU5, and may be about ½ of that of the resistance portion 440XU3, for example.

The resistance portions 440XU1, 440XU2, 440XU3, 440XU4 and 440XU5 are formed to have the same thickness (height from a surface of the transparent conductive layer 22). Further, in this embodiment, the resistance portions 440XU1, 440XU2, 440XU3, 440X04 and 440XU5 may be positioned such that a space between the adjacent resistance portions becomes the same.

By providing the resistance portions 440XU1, 440XU2, 440XU3, 440XU4 and 440XU5 such that the closer to the center in the X-axis direction, the longer the length of the resistance portion becomes, the combined resistance values of the electrode portion 23XU and the resistance portions 440XU in the Y-axis direction become lower at the center and higher at the edges in the longitudinal direction of the electrode portion 23XU.

Similarly, the resistance portions 440YL are positioned along the electrode 23YL. The resistance portions 440YL are referred to as resistance portions 440YL1, 440YL2, 440YL3, 440YL4 and 440YL5, which are aligned in this order from the corner portion UL to the corner portion LL. Among the resistance portions 440YL1, 440YL2, 440YL3, 440YL4 and 440YL5, the resistance portion 440YL3, which is positioned at the center in the Y-axis direction, has the longest length, and the resistance portions 440YL1 and 440YL5, which are positioned at the edges in the Y-axis direction, have the shortest length where the length of the resistance portions 440YL1 and 440YL5 is about ¼ of that of the resistance portion 440YL3, for example.

The length of the resistance portions 440YL2 and 440YL4, which are positioned between the resistance portion 440YL3 and the resistance portions 440YL1 and 440YL5, respectively, is about middle of the length of the resistance portion 440YL3 and the length of the resistance portions 440YL1 and 440YL5, and may be about ½ of that of the resistance portion 440YL3, for example.

The resistance portions 440YL1, 440YL2, 440YL3, 440YL4 and 440YL5 are formed to have the same thickness (height from a surface of the transparent conductive layer 22). Further, in this embodiment, the l resistance portions 440YL1, 440YL2, 440YL3, 440YL4 and 440YL5 may be positioned such that a space between the adjacent resistance portions becomes the same.

By providing the resistance portions 440YL1, 440YL2, 440YL3, 440YL4 and 440YL5 such that the closer to the center in the Y-axis direction, the longer the length of the resistance portion becomes, the combined resistance values of the electrode portion 23YL and the resistance portions 440YL in the X-axis direction become lower at the center and higher at the edges in the longitudinal direction of the electrode portion 23YL.

Similarly, the resistance portions 440YR are positioned along the electrode 23YR. The resistance portions 440YR are referred to as resistance portions 440YR1, 440YR2, 440YR3, 440YR4 and 440YR5, which are aligned in this order from the corner portion UR to the corner portion LR. Among the resistance portions 440YR1, 440YR2, 440YR3, 440YR4 and 440YR5, the resistance portion 440YR3, which is positioned at the center in the Y-axis direction, has the longest length, and the resistance portions 440YR1 and 440YR5, which are positioned at the edges in the Y-axis direction, have the shortest length where the length of the resistance portions 440YR1 and 440YR5 is about ¼ of that of the resistance portion 440YR3, for example.

The length of the resistance portions 440YR2 and 440YR4, which are positioned between the resistance portion 440YR3 and the resistance portions 440YR1 and 440YR5, respectively, is about middle of the length of the resistance portion 440YR3 and the length of the resistance portions 440YR1 and 440YR5, and may be about ½ of that of the resistance portion 440YR3, for example.

The resistance portions 440YR1, 440YR2, 440YR3, 440YR4 and 440YR5 are formed to have the same thickness (height from a surface of the transparent conductive layer 22). Further, in this embodiment, the resistance portions 440YR1, 440YR2, 440YR3, 440YR4 and 440YR5 may be positioned such that a space between the adjacent resistance portions becomes the same.

By providing the resistance portions 440YR1, 440YR2, 440YR3, 440YR4 and 440YR5 such that the closer to the center in the Y-axis direction, the longer the length of the resistance portion becomes, the combined resistance values of the electrode portion 23YR and the resistance portions 440YR in the X-axis direction become lower at the center and higher at the edges in the longitudinal direction of the electrode portion 23YR.

The resistance portions 440XL and 440XU are an example of one of a group including a first resistance portion and a second resistance portion and a group including a third resistance portion and a fourth resistance portion. The resistance portions 440YL and 440YR are an example of the other of the groups.

Thus, according to the lower electrode substrate 420 of the touch panel 100 of the fourth embodiment, similar to the lower electrode substrate 20 of the touch panel 100 of the first embodiment, the distortion of the electric potential distribution can be reduced (see FIG. 8A and FIG. 8B).

By setting the combined resistance values of the electrode portions 23XL and 23XU and the resistance portions 440XL and 440XU lower at the center and higher at the edges in the longitudinal direction, respectively, the electric potential gradients in the Y-axis direction become sharper at the edges than at the center so that the equipotential lines are not curved even at the edges.

Further, by setting the combined resistance values of the electrode portions 23YL and 23YR and the resistance portions 440YL and 440YR lower at the center and higher at the edges in the longitudinal direction, respectively, the electric potential gradients in the X-axis direction become sharper at the edges than at the center so that the equipotential lines are not curved even at the edges.

According to the lower electrode substrate 420 of the touch panel 100 of the fourth embodiment, similar to the lower electrode substrate 20 of the touch panel 100 of the first embodiment, uniform electric potential distributions can be obtained in the X-axis direction and in the Y-axis direction.

(Fifth Embodiment)

Figure 12:
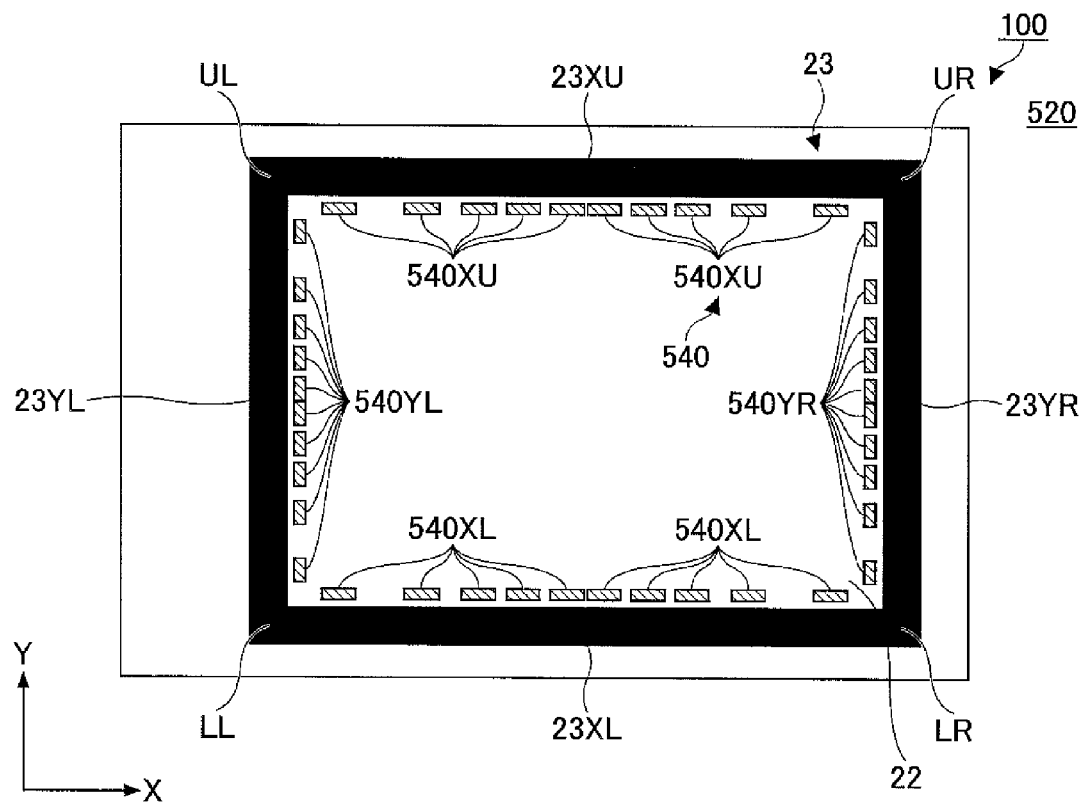
FIG. 12 is a plan view showing an example of a structure of a lower electrode substrate of the touch panel of a fifth embodiment.

FIG. 12 is a plan view showing an example of a structure of a lower electrode substrate 520 of the touch panel 100 of the fifth embodiment. Although the structure of the lower electrode substrate 520 of the touch panel of the fifth embodiment is different from that of the touch panel 100 of the first embodiment, the rest of the parts are the same. Thus, only the explanation of the lower electrode substrate 520 of the touch panel 100 of the fifth embodiment is explained with reference to FIG. 12.

For the lower electrode substrate 520 of the fifth embodiment, the resistance adjusting member is provided to be positioned at the inside of the electrode 23.

The lower electrode substrate 520 includes the electrode 23 formed on the transparent conductive layer 22, and a resistance adjusting member 540 formed on the transparent conductive layer 22 and positioned at the inside of the electrode 23 having the rectangular ring shape in a plan view.

The electrode 23 is the same as the electrode 23 of the lower electrode substrate 20 of the first embodiment, and includes the electrode portions 23XL, 23XU, 23YL and 23YR.

The resistance adjusting member 540 includes resistance portions 540XL, 540XU, 540YL and 540YR.

Similar to the resistance portions 40XL, 40XU, 40YL and 40YR of the resistance adjusting member 40, 10 of each of the resistance portions 540XL, 540XU, 540YL and 540YR are provided.

The resistance portions 540XL, 540XU, 540YL and 540YR may be made of an Ag paste, by printing, for example. The resistance value of the Ag paste may be about 1/10 of the resistance value of Ag—C which composes the electrode portions 23XL, 23XU, 23YL and 23YR. In other words, the resistance value of the resistance portions 540XL, 540XU, 540YL and 540YR is lower than that of the electrode portions 23XL, 23XU, 23YL and 23YR in this embodiment. Further, the resistance value of the electrode portions 23XL, 23XU, 23YL and 23YR is lower than that of the transparent conductive layer 22 in this embodiment.

In this embodiment, the resistance adjusting member 540 includes 10 resistance portions 540XL and 10 resistance portions 540XU, for example as described above. In this embodiment, the length of the resistance portions 540XL and 540XU may be the same. Further in this embodiment, the length of each of the resistance portions 540XL and 540XU may be, for example, 1/20 of the length of the electrode portions 23XL and 23XU.

In this embodiment, the resistance portions 540XL and 540XU are densely provided at a center and sparsely provided at edges in the longitudinal direction of the electrode portions 23XL and 23XU, respectively.

In other words, the resistance portions 540XL and 540XU are provided such that a space between the adjacent resistance portions 540XL and 540XU is small at a center and large at edges in the longitudinal direction of the electrode portions 23XL and 23XU, respectively.

The resistance portions 540XL are positioned in the vicinity of the electrode portion 23XL on the transparent conductive layer 22. Thus, by providing the resistance portions 540XL as described above, combined resistance values of the electrode portion 23XL and the resistance portions 540XL in the Y-axis direction become lower at the center and higher at the edges in the longitudinal direction of the electrode portion 23XL.

Similarly, the resistance portions 540XU are positioned in the vicinity of the electrode portion 23XU on the transparent conductive layer 22. Thus, by providing the resistance portions 540XU as described above, combined resistance values of the electrode portion 23XU and the resistance portions 540XU in the Y-axis direction become lower at the center and higher at the edges in the longitudinal direction of the electrode portion 23XU.

Similarly in this embodiment, the resistance adjusting member 540 includes 10 resistance portions 540YL and 10 resistance portions 540YR, for example. In this embodiment, the length of the resistance portions 540YL and 540YR may be the same. Further in this embodiment, the length of each of the resistance portions 540YL and 540YR may be, for example, 1/20 of the length of the electrode portions 23YL and 23YR.

In this embodiment, the resistance portions 540YL and 540YR are densely provided at a center and sparsely provided at edges in the longitudinal direction of the electrode portions 23YL and 23YR, respectively.

In other words, the resistance portions 540YL and 540YR are provided such that a space between the adjacent resistance portions 540YL and 540YR is small at the center and large at the edges in the longitudinal direction of the electrode portions 23YL and 23YR.

The resistance portions 540YL are positioned in the vicinity of the electrode portion 23YL on the transparent conductive layer 22. Thus, by providing the resistance portions 540YL as described above, combined resistance values of the electrode portion 23YL and the resistance portions 540YL in the X-axis direction become lower at the center and higher at the edges in the longitudinal direction of the electrode portion 23YL.

Similarly, the resistance portions 540YR are positioned in the vicinity of the electrode portion 23YR on the transparent conductive layer 22. Thus, by providing the resistance portions 540YR as described above, combined resistance values of the electrode portion 23YR and the resistance portions 540YR in the X-axis direction become lower at the center and higher at the edges in the longitudinal direction of the electrode portion 23YR.

The resistance portions 540XL and 540XU are an example of one of a group including a first resistance portion and a second resistance portion and a group including a third resistance portion and a fourth resistance portion. The resistance portions 540YL and 540YR are an example of the other of the groups.

As described above, by providing the resistance portions 540XL, 540XU, 540YL and 540YR to be densely arranged at the center and sparsely arranged at the edges of the longitudinal direction of the electrode portions 23XL, 23XU, 23YL and 23YR, respectively, the combined resistance values of the electrode portions 23XL, 23XU, 23YL and 23YR and the resistance portions 540XL, 540XU, 540YL and 540YR become lower at the center and higher at the edges in the longitudinal direction of the electrode portions 23XL, 23XU, 23YL and 23YR. With this, distortion of the electric potential distribution on the transparent conductive layer 22 can be reduced.

Thus, according to the lower electrode substrate 520 of the touch panel 100 of the fifth embodiment, similar to the lower electrode substrate 20 of the touch panel 100 of the first embodiment, the distortion of the electric potential distribution can be reduced (see FIG. 8A and FIG. 8B).

By setting the combined resistance values of the electrode portions 23XL and 23XU and the resistance portions 540XL and 540XU lower at the center and higher at the edges in the longitudinal direction, respectively, the electric potential gradients in the Y-axis direction become sharper at the edges than at the center so that the equipotential lines are not curved even at the edges.

Further, by setting the combined resistance values of the electrode portions 23YL and 23YR and the resistance portions 540YL and 540YR lower at the center and higher at the edges in the longitudinal direction, respectively, the electric potential gradients in the X-axis direction become sharper at the edges than at the center so that the equipotential lines are not curved even at the edges.

According to the lower electrode substrate 520 of the touch panel 100 of the fifth embodiment, similar to the lower electrode substrate 20 of the touch panel 100 of the first embodiment, uniform electric potential distributions can be obtained in the X-axis direction and in the Y-axis direction.

(Sixth Embodiment)

Figure 13A:
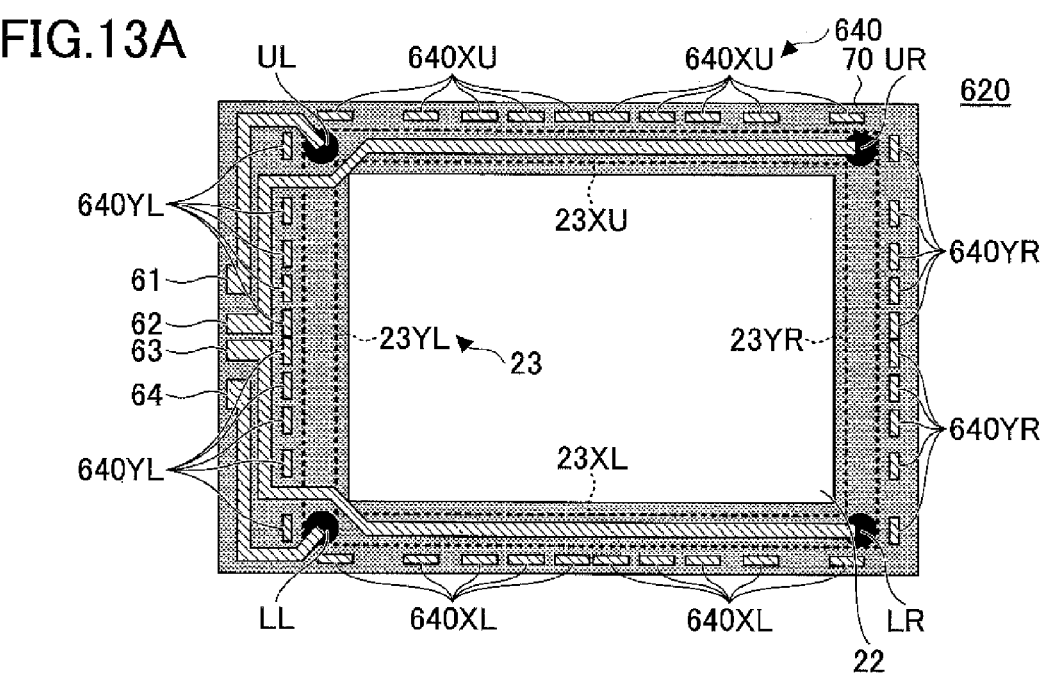
FIG. 13A and FIG. 13B are plan views showing an example of a structure of a lower electrode substrate of the touch panel of a sixth embodiment.
Figure 13B:
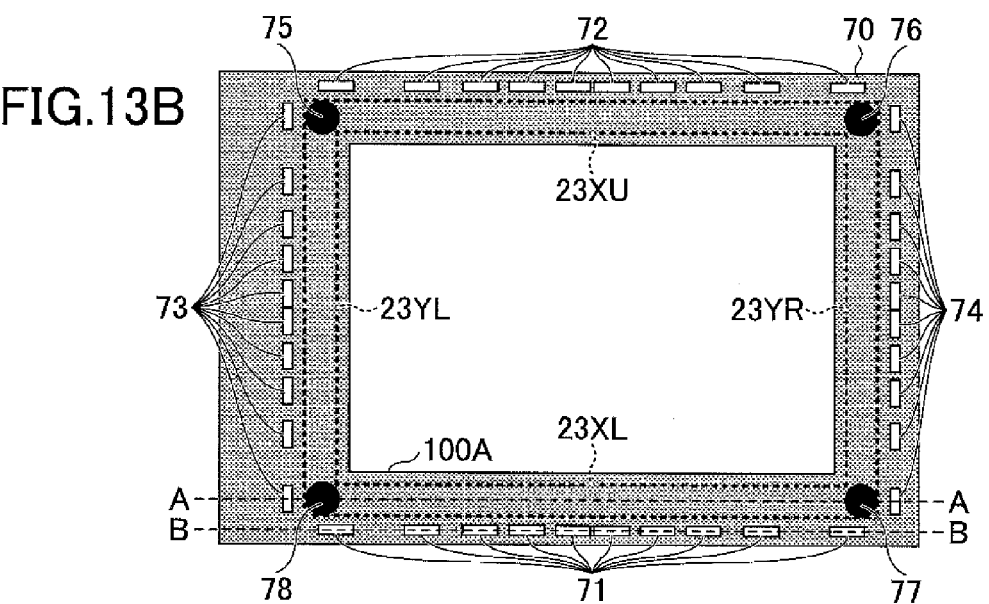

FIG. 13A and FIG. 13B are plan views showing an example of a structure of a lower electrode substrate 620 of the touch panel 100 of the sixth embodiment. Although the structure of the lower electrode substrate 620 of the touch panel of the sixth embodiment is different from that of the touch panel 100 of the first embodiment, the rest of the parts are the same. Thus, only the explanation of the lower electrode substrate 620 of the touch panel 100 of the sixth embodiment is explained with reference to FIG. 13A and FIG. 13B.

For the lower electrode substrate 620 of the sixth embodiment, a resistance adjusting member 640 is provided on a surface of the transparent conductive layer 22.

The resistance adjusting member 640 includes resistance portions 640XL, 640XU, 640YL and 640YR which are provided to be positioned at the outside of the electrode portions 23XL, 23XU, 23YL and 23YR of the electrode 23, respectively in a plan view. The resistance portions 640XL and 640XU are positioned in the vicinity of the electrode portions 23XL and 23XU along the X-axis direction, respectively. The resistance portions 640YL and 640YR are positioned in the vicinity of the electrode portions 23YL and 23YR along the Y-axis direction, respectively.

The resistance portions 640XL, 640XU, 640YL and 640YR have the same structure as the resistance portions 40XL, 40XU, 40YL and 40YR of the touch panel 100 of the first embodiment, respectively.

As shown in FIG. 13A, for the lower electrode substrate 620, the structure of an insulating layer 70 which is formed on the electrode portions 23XL, 23XU, 23YL and 23YR of the lower electrode substrate 20 of the sixth embodiment is different from that of the first embodiment.

In this embodiment, interconnect portions 61, 62, 63 and 64, which are connected to the electrode 23 at the corner portion UL, UR, LR, LL, respectively, are formed on the insulating layer 70.

The resistance portions 640XL, 640XU, 640YL and 640YR are formed in hole portions formed in the insulating layer 70.

As shown in FIG. 13B, the insulating layer 70 is provided with hole portions 71, 72, 73 and 74 to form the resistance portions 640XL, 640XU, 640YL and 640YR, and hole portions 75, 76, 77 and 78 to form contacts for connecting the interconnect portions 61, 62, 63 and 64 to the electrode portions 23XL, 23XU, 23YL and 23YR at the corner portions UL, UR, LR and LL. At the state shown in FIG. 13B, the insulating layer 70 is formed on the electrode portions 23XL, 23XU, 23YL and 23YR (except the display part 100A of the touch panel 100).

Figure 13C:
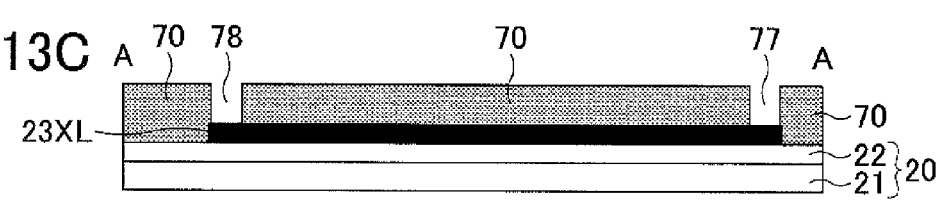
FIG. 13C is a cross-sectional view taken along an A-A line of FIG. 13B.
Figure 13D:
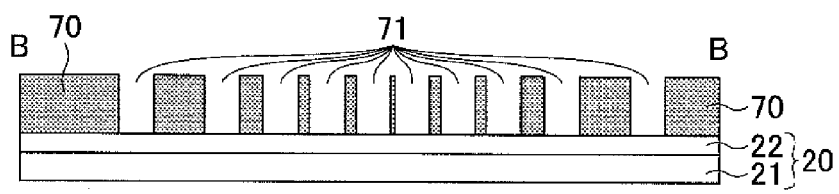
FIG. 13D is a cross-sectional view taken along a B-B line of FIG. 13B.

FIG. 13C is a cross-sectional view taken along an A-A line of FIG. 13B, FIG. 13D is a cross-sectional view taken along a B-B line of FIG. 13B.

As shown in FIG. 13C, the hole portions 77 and 78 are formed to reach a surface of the electrode portion 23XL at the corner portions LL and LR to expose the surface of the electrode portion 23XL. Although not shown in FIG. 13C, similarly, the hole portions 75 and 76 are formed to reach a surface of the electrode portion 23XU at the corner portions UL and UR.

As shown in FIG. 13D, the hole portions 71 is formed to reach a surface of the transparent conductive layer 22 to expose the surface of the transparent conductive layer 22. The hole portions 72, 73 and 74 are formed as the same.

For the lower electrode substrate 620 of the touch panel 100 of the sixth embodiment, the interconnect portions 61, 62, 63 and 64 and the resistance portions 640XL, 640XU, 640YL and 640YR can be formed at the same time (in a same manufacturing process).

The interconnect portions 61, 62, 63 and 64 and the resistance portions 640XL, 640XU, 640YL, and 640YR may be made of an Ag paste, by printing, for example.

For the lower electrode substrate 20 of the touch panel 100 of the first embodiment, the interconnect portions (correspond to the interconnect portions 61 to 64 of the sixth embodiment) which are to be connected to the electrode 23 at the corner portion UL, UR, LR, LL are formed on the insulating layer which is formed on the resistance portions 40XL, 40XU, 40YL and 40YR. Thus, the interconnect portions which are to be connected to the electrode 23 at the corner portion UL, UR, LR, LL and the resistance portions 40XL, 40XU, 40YL and 40YR cannot be formed at the same time. However, according to the sixth embodiment, the interconnect portions 61, 62, 63 and 64 and the resistance portions 640XL, 640XU, 640YL and 640YR can be formed at the same time.

Further, the electrode portions 23XL, 23XU, 23YL and 23YR and the resistance portions 640XL, 640XU, 640YL and 640YR of the lower electrode substrate 620 of the sixth embodiment have the same structure as the electrode portions 23XL, 23XU, 23YL and 23YR and the resistance portions 40XL, 40XU, 40YL and 40YR of the lower electrode substrate 20 of the first embodiment, respectively.

By setting the combined resistance values of the electrode portions 23XL and 23XU and the resistance portions 640XL and 640XU lower at the center and higher at the edges in the longitudinal direction, respectively, the electric potential gradients in the Y-axis direction become sharper at the edges than at the center so that the equipotential lines are not curved even at the edges.

Further, by setting the combined resistance values of the electrode portions 23YL and 23YR and the resistance portions 640YL and 640YR lower at the center and higher at the edges in the longitudinal direction, respectively, the electric potential gradients in the X-axis direction become sharper at the edges than at the center so that the equipotential lines are not curved even at the edges.

According to the embodiment, a touch panel in which the distortion of the electric potential distribution is reduced can be provided.

Although the resistance adjusting member of the above embodiments is configured to include both a pair of resistance portions which are aligned in the X-axis direction, and a pair of resistance portions which are aligned in the Y-axis direction, the resistance adjusting member may include one of the pairs of resistance portions.

Although a preferred embodiment of the touch panel has been specifically illustrated and described, it is to be understood that minor modifications may be made therein without departing from the sprit and scope of the invention as defined by the claims.

The present invention is not limited to the specifically disclosed embodiments, and variations and modifications may be made without departing from the scope of the present invention.

The present application is based on Japanese Priority Application No. 2011-141143 filed on Jun. 24, 2011, the entire contents of which are hereby incorporated herein by reference.

What is claimed is:

1. A touch panel comprising:
   a first electrode substrate including a first substrate and a first conductive layer formed on the first substrate;
   a second electrode substrate including a second substrate and a second conductive layer formed on the second substrate to face the first conductive layer;
   a first electrode and a second electrode provided to be parallel to each other directly on the first conductive layer for causing an electric potential distribution;
   a third electrode and a fourth electrode provided to be parallel to each other directly on the first conductive layer for causing an electric potential distribution,
   the first electrode and the second electrode being connected by the third electrode and the fourth electrode such that the first electrode, the third electrode, the second electrode and the fourth electrode form a continuous rectangular ring shape surrounding a touching area of the touch panel; and
   a first resistance portion and a second resistance portion provided directly on the first conductive layer along the first electrode and the second electrode, respectively,
   the first resistance portion including a plurality of resistance elements provided from one edge to another edge of the first electrode,
   the first resistance portion being electrically connected to the first electrode with no connection between each of the resistance elements of the first resistance portion and the first electrode other than the first conductive layer,
   the second resistance portion including a plurality of resistance elements provided from one edge to another edge of the second electrode,
   the second resistance portion being electrically connected to the second electrode with no connection between each of the resistance elements of the second resistance portion and the second electrode other than the first conductive layer,
   a material composing the first resistance portion and the second resistance portion having a lower resistance value than a material composing the first conductive layer, and
   the first resistance portion and the second resistance portion being configured such that resistance values of the first resistance portion and the second resistance portion become lower at the center than at the outer sides in the longitudinal direction of the first electrode and the second electrode, respectively,
   wherein the material composing the first resistance portion and the second resistance portion has a lower resistance value than a material composing the first electrode and the second electrode.

2. The touch panel according to claim 1,
   wherein the first resistance portion and the second resistance portion are positioned at outsides of the first electrode and the second electrode, respectively.

3. The touch panel according to claim 1,
   wherein the first resistance portion and the second resistance portion are positioned at insides of the first electrode and the second electrode, respectively.

4. The touch panel according to claim 1,
   wherein the first resistance portion is formed to have a width wider at a center and smaller at outer sides in the longitudinal direction of the first electrode portion, and
   the second resistance portion is formed to have a width wider at a center and smaller at outer sides in the longitudinal direction of the second electrode portion.

5. The touch panel according to claim 1,
   wherein the resistance elements of the first resistance portion are provided along the first electrode such that a length of the resistance elements are set as the closer to the center in the longitudinal direction of the first electrode, the longer the length of the resistance portion becomes, and
   the resistance elements of the second resistance portion are provided along the second electrode such that a length of the resistance elements are set as the closer to the center in the longitudinal direction of the second electrode, the longer the length of the resistance portion becomes.

6. The touch panel according to claim 1,
   wherein the resistance elements of the first resistance portion are provided along the first electrode such that the plural resistance elements are densely arranged at the center and sparsely arranged at the outer sides in the longitudinal direction of the first electrode, and
   the resistance elements of the second resistance portion are provided along the second electrode such that the plural resistance elements are densely arranged at the center and sparsely arranged at the outer sides in the longitudinal direction of the second electrode.

7. The touch panel according to claim 1, further comprising:
   a third resistance portion and a fourth resistance portion provided on the first conductive layer along the third electrode and the fourth electrode, respectively,
   the third resistance portion including a plurality of resistance elements provided from one edge to another edge of the third electrode,
   the third resistance portion being electrically connected to the third electrode with no connection between each of the resistance elements of the third resistance portion and the third electrode other than the first conductive layer,
   the fourth resistance portion including a plurality of resistance elements provided from one edge to another edge of the fourth electrode,
   the fourth resistance portion being electrically connected to the fourth electrode with no connection between each of the resistance elements of the fourth resistance portion and the fourth electrode other than the first conductive layer,
   a material composing the third resistance portion and the fourth resistance portion having a lower resistance value than the material composing the first conductive layer, and
   the third resistance portion and the fourth resistance portion being configured such that resistance values of the third resistance portion and the fourth resistance portion become lower at the center than at the outer sides in the longitudinal direction of the third electrode and the fourth electrode, respectively.

8. The touch panel according to claim 7,
wherein the material composing the third resistance portion and the fourth resistance portion has a lower resistance value than a material composing the third electrode and the fourth electrode.

9. A touch panel comprising:
a first electrode substrate including a first substrate and a first conductive layer formed on the first substrate;
a second electrode substrate including a second substrate and a second conductive layer formed on the second substrate to face the first conductive layer;
a first electrode and a second electrode provided to be parallel to each other directly on the first conductive layer for causing an electric potential distribution,
the first electrode and the second electrode being arranged such that the first electrode and the second electrode are provided at ends of a touching area of the touch panel; and
a first resistance portion and a second resistance portion provided directly on the first conductive layer along the first electrode and the second electrode, respectively,
the first resistance portion including a plurality of resistance elements provided from one edge to another edge of the first electrode,
the first resistance portion being electrically connected to the first electrode with no connection between each of the resistance elements of the first resistance portion and the first electrode other than the first conductive layer,
the second resistance portion including a plurality of resistance elements provided from one edge to another edge of the second electrode,
the second resistance portion being electrically connected to the second electrode with no connection between each of the resistance elements of the second resistance portion and the second electrode other than the first conductive layer,
a material composing the first resistance portion and the second resistance portion having a lower resistance value than a material composing the first conductive layer, and
the first resistance portion and the second resistance portion being configured such that resistance values of the first resistance portion and the second resistance portion become lower at the center than at the outer sides in the longitudinal direction of the first electrode and the second electrode, respectively,
wherein the material composing the first resistance portion and the second resistance portion has a lower resistance value than a material composing the first electrode and the second electrode.

* * * * *